US011636517B2

(12) United States Patent
Lee

(10) Patent No.: US 11,636,517 B2
(45) Date of Patent: Apr. 25, 2023

(54) COMMUNICATION DEVICE INTERFACE FOR MERCHANT CHECK-IN AND SHOPPING NOTIFICATIONS

(71) Applicant: PAYPAL, INC., San Jose, CA (US)

(72) Inventor: Hyunju Lee, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/353,656

(22) Filed: Jun. 21, 2021

(65) Prior Publication Data
US 2021/0312499 A1 Oct. 7, 2021

Related U.S. Application Data

(63) Continuation of application No. 16/438,354, filed on Jun. 11, 2019, now Pat. No. 11,042,902, which is a continuation of application No. 14/508,874, filed on Oct. 7, 2014, now Pat. No. 10,318,991.

(60) Provisional application No. 61/889,916, filed on Oct. 11, 2013, provisional application No. 61/888,211, filed on Oct. 8, 2013, provisional application No. 61/888,197, filed on Oct. 8, 2013.

(51) Int. Cl.
G06Q 30/00 (2012.01)
G06Q 30/02 (2012.01)
G06Q 30/0251 (2023.01)
G06Q 30/0207 (2023.01)

(52) U.S. Cl.
CPC ..... G06Q 30/0261 (2013.01); G06Q 30/0207 (2013.01); G06Q 30/0255 (2013.01); G06Q 30/0267 (2013.01); G06Q 30/0269 (2013.01)

(58) Field of Classification Search
None
See application file for complete search history.

(56) References Cited

U.S. PATENT DOCUMENTS

2002/0147642 A1* 10/2002 Avallone ............ G06Q 30/0269
705/14.27
2004/0054625 A1 3/2004 Kellogg et al.
(Continued)

OTHER PUBLICATIONS

IP.com—IQQueryQuick Export NPL Search Query dated Feb. 10, 2021, 2 pages.
(Continued)

Primary Examiner — Matthew T Sittner
(74) Attorney, Agent, or Firm — Haynes and Boone, LLP

(57) ABSTRACT

There are provided systems and methods for a communication device interface for merchant check-in and shopping notifications. A user may enter shopping preferences to a module of a communication device in order to receive notifications and alerts when items matching the shopping preferences are available with one or more merchants. A service provider may receive the shopping preferences with user attributes, such as a user location and/or account balance. The attributes may be determined using applications and/or modules of the communication device or through a check-in by the user at a location. The service provider may determine shopping notifications having purchase offers for the items from available merchants. The purchase offers may include offers to sell the items and discounts for the items. The shopping notifications may be displayed to the user using a user device interface, such as cells within an application or mobile device home screen.

20 Claims, 39 Drawing Sheets

(56) References Cited

U.S. PATENT DOCUMENTS

| | | |
|---|---|---|
| 2005/0228736 A1 | 10/2005 | Norman et al. |
| 2006/0200387 A1 | 9/2006 | Saini |
| 2007/0136418 A1 | 6/2007 | Wolfe |
| 2007/0235519 A1 | 10/2007 | Jang et al. |
| 2008/0028337 A1 | 1/2008 | Michaud et al. |
| 2008/0059317 A1 | 3/2008 | Chandran et al. |
| 2008/0172331 A1 | 7/2008 | Graves et al. |
| 2008/0245863 A1 | 10/2008 | Buchheit |
| 2008/0313551 A1 | 12/2008 | Rapoport |
| 2009/0106300 A1* | 4/2009 | Brown ................ G06Q 10/107 707/999.102 |
| 2010/0113072 A1 | 5/2010 | Gibson et al. |
| 2010/0205236 A1 | 8/2010 | Ochiai |
| 2010/0235210 A1 | 9/2010 | Nadrotowicz, Jr. |
| 2011/0191663 A1* | 8/2011 | Magas ................ G06F 17/00 715/201 |
| 2011/0282700 A1 | 11/2011 | Cockcroft |
| 2011/0283208 A1* | 11/2011 | Gallo ................ G06F 9/542 715/764 |
| 2012/0029992 A1 | 2/2012 | De |
| 2012/0272278 A1 | 10/2012 | Bedi |
| 2013/0069982 A1* | 3/2013 | Hall ................ G06Q 30/0261 345/650 |
| 2013/0085924 A1* | 4/2013 | Colak ................ G06Q 40/025 705/38 |
| 2013/0166332 A1 | 6/2013 | Hammad |
| 2013/0179246 A1 | 7/2013 | Ross |
| 2013/0246148 A1 | 9/2013 | Ross et al. |
| 2013/0282438 A1* | 10/2013 | Hunter ................ G06Q 30/0201 705/7.32 |
| 2013/0332284 A1* | 12/2013 | Faith ................ G06Q 30/0225 705/14.66 |
| 2014/0025551 A1 | 1/2014 | Miles et al. |
| 2014/0032325 A1* | 1/2014 | Weiss ................ G06Q 30/0261 705/14.58 |
| 2014/0067623 A1* | 3/2014 | Abraham ................ G06Q 50/01 705/27.1 |
| 2014/0136327 A1 | 5/2014 | Gopavarapu |
| 2014/0156749 A1* | 6/2014 | Kanter ................ G06Q 30/0261 709/204 |
| 2015/0066802 A1 | 3/2015 | Goulart et al. |
| 2015/0100405 A1 | 4/2015 | Lee |

OTHER PUBLICATIONS

STIC EIC Search Report 3600 for U.S. Appl. No. 16/438,354, dated Nov. 2, 2020, 27 pages.

* cited by examiner

COMMUNICATION DEVICE INTERFACE FOR MERCHANT CHECK-IN AND SHOPPING NOTIFICATIONS

CROSS REFERENCE TO RELATED APPLICATION

The application is a continuation of U.S. patent application Ser. No. 16/438,354, filed Jun. 11, 2019, which is a continuation of U.S. patent application Ser. No. 14/508,874, filed Oct. 7, 2014, now U.S. Pat. No. 10,318,991, issued Jun. 11, 2019, which claims priority to U.S. Provisional Patent Application No. 61/888,197, filed Oct. 8, 2013, U.S. Provisional Patent Application No. 61/888,211, filed Oct. 8, 2013, and U.S. Provisional Patent Application No. 61/889,916, filed Oct. 11, 2013, all of which are incorporated by reference in their entirety.

TECHNICAL FIELD

Example embodiments of the present application relate generally to a communication device interface for merchant check-in and shopping notifications and more specifically to providing an interface for a communication device where a user may view a merchant's check-in opportunities, offers, and shopping notifications and process purchases with the merchant.

BACKGROUND

Users may have shopping preferences corresponding to items, item discounts, and/or merchant locations. For example, a user may wish to purchase a specific item, or may wish to view items available with a merchant. However, in order to access information corresponding to those shopping preferences, the user may be required to retrieve information available online, through a merchant application, or directly from the merchant. Where a user is unsure of a best price for an item and wishes to engage in comparative shopping, the user may perform multiple searches with multiple different merchants. Therefore, the user may not optimize purchase prices and/or item preferences without going through manual steps performed by the user, and in some cases may miss potential savings from short term sales, coupons, or other item discounts. Additionally, the user may be unaware of local merchants and/or item offers and discounts at merchants the user is visiting. For example, a user may visit a coffeehouse to purchase coffee but be unaware that the merchant is presently offering 10% of drink purchases with food purchases. Thus, the user may not maximize their shopping experience unless they perform prior research on their shopping preferences and locations the user expects to visit.

Figure 1:
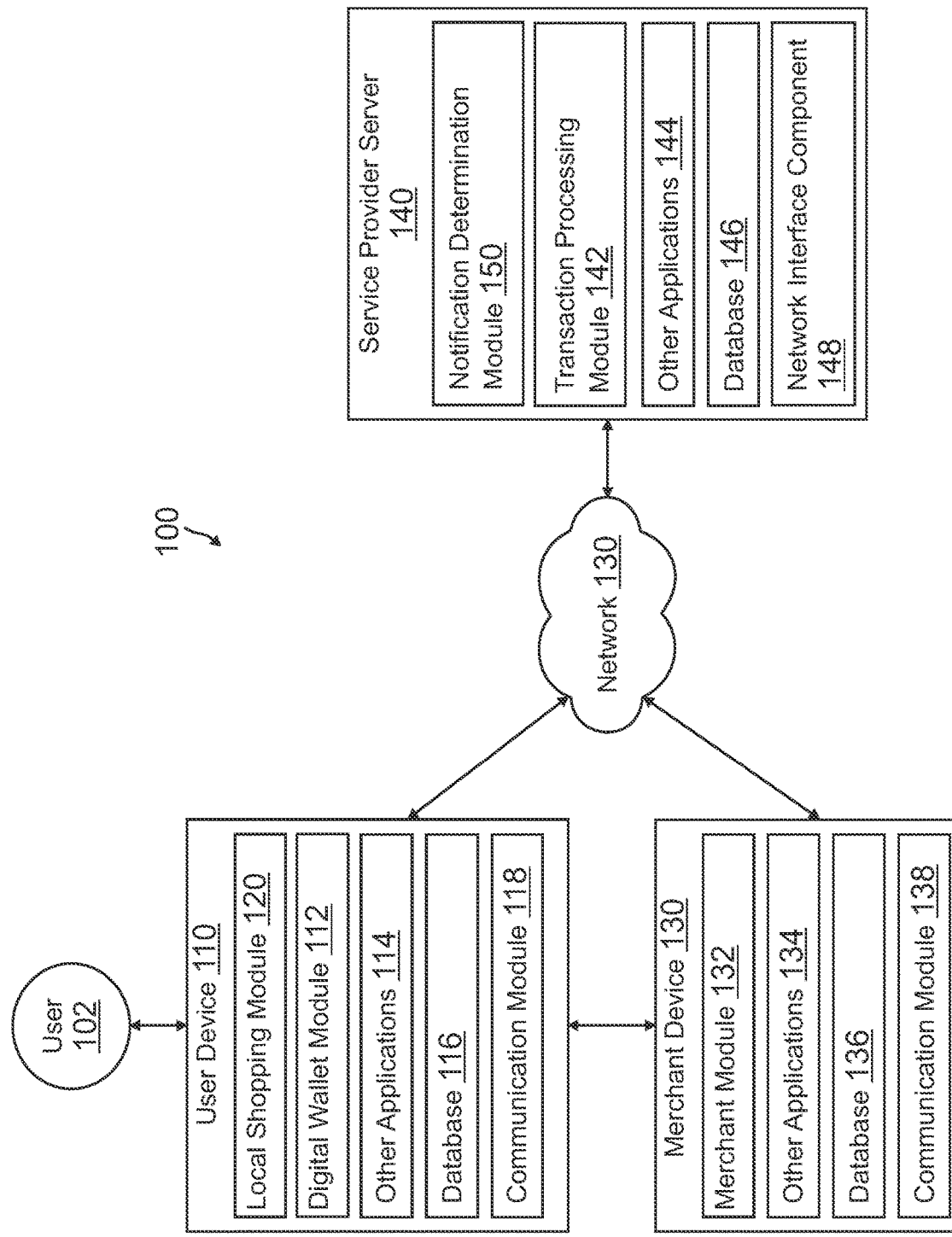
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that present a communication device interface for merchant check-in and shopping notifications. Systems suitable for practicing methods of the present disclosure are also provided.

In various embodiments, a user may utilize a user device, such as a communication device (e.g., a smart phone, tablet computer, etc.) in order to receive shopping notifications displayed in a device interface that include purchase offers corresponding to one or more shopping preferences of the user and current attributes of the user. The communication device may include specialized hardware and/or software, for example, a device module, that first receives user shopping preferences through an input device and/or from user data stored with the user device previously input by the user or received from a third party (e.g., through scrapping on online source, such as a social networking account and/or microblogging service of the user). The device module may correspond to a local shopping module that may transmit the shopping preferences for analysis, for example, by a service provider and/or merchant. The shopping preferences may correspond to desired items for purchase, desired item discounts including categories of discounts and/or specific item discounts, or preferred merchants. The local shopping module may utilize a communication module of the user device to communicate the shopping preferences to a service provider and/or merchant.

The local shopping module may also collect and transmit attributes for the user. For example, a location determining module of the communication device may passively monitor the user's location, for example, monitoring the user's location without user input/requests and in the background of the user device. The location determining module may utilize a mapping service (e.g., accessible through the communication module through a network connection), or may access a user device component, such as a GPS sensor. The location determining module may also determine the user's location through a check-in by the user device at a merchant location. The check-in may be generated by a connection between the communication device and a merchant device/server for the merchant location. In other embodiments, a check-in service available through a network connection may also establish the check-in for the user at the merchant location. In some embodiments, the application may transmit the user location information to a server for analysis. Further, the user may set a location as the user's location, such as a home address and/or work address.

The user may receive one or more notifications based on these shopping preferences on a user device. The notifications may include a shopping option for the user, such as a purchase offer for one or more items matching the shopping preference from one or more merchants. For example, the purchase offer may correspond to an offer for an item corresponding to the shopping preferences, an item discount corresponding to the shopping preferences, and a merchant location corresponding to the shopping preferences. The notifications may be sent to the user device for display to the user as soon as the notification is determined from the shopping preferences. However, in other embodiments, the notification may be transmitted to the user device only when a user established parameter is met using the shopping preferences and/or the user attributes. For example, the established parameter may correspond to a set price for the item, a specific item discount and/or amount of the discount, a specific merchant location, and/or a merchant location in proximity to the user. Thus, the service provider may determine if one or more merchants in proximity to the user location information are offering an item discount, such as a sale, coupon, rebate, or other discount. Shopping preferences may limit the merchant search, for example, constricting the proximity distance from the user location, limiting merchants/items to certain brands, subjects, and/or cost, or other user preferences.

After receiving the shopping notification through the communication module of the communication device, the local shopping module may display the shopping notification through a device interface. A popup may display on the user's home screen, lock screen, through an application interface, or elsewhere. The popup may include merchant location information such as a map with the merchant location(s), a link to a map or the merchant's web site, written directions to the merchant, and/or a distance approximation to the merchant. The user may then see this information and determine if the user would like to travel to the merchant location and redeem the item discount.

In various embodiments, a local shopping module may generate displayable cells corresponding to the shopping notification in an application interface, a home screen interface or background of the communication device, or through another feed of the user device, such as a toolbar. The cell(s) may include the item(s) corresponding to the shopping preferences. For example, a user may enter a commerce website, a merchant brand, and merchant location, an item, and/or an item category as the shopping preferences. Thus, the cell(s) may include an item matching these preferences, such as an item for the commerce website, an item from the merchant, etc. The cell(s) may be generated with a lowest price from a merchant displayed to the user and presented to the user so that the user may purchase the item at a lowest price offer for the item in the shopping notifications.

Utilizing the user attributes, the cell(s) may be updated with a merchant location corresponding to the item. Additionally, the communication device and/or service provider may transmit the shopping notification and user attributes to one or more other merchants who may offer the item for sale. The other merchant(s) may view the item and attempt to price match or offer a price reduction for the item to the user. The other merchant(s) may match the location information of the user and thus present purchase options for the user that maximize a user's savings and also fit their location criteria. Moreover, one shopping notification may be used to determine one or more other shopping notifications by the service provider. For example, the subject of a shopping notification generated using shopping preferences and user attributes (e.g. travel and/or trip locations) may populate other shopping notifications related to the subject (e.g. hotels, clothing, sightseeing, or other items related to the travel and/or trip locations).

The user may utilize the user device to select the notification(s) and view more information about the purchase offer. The shopping notification(s) may then display additional information about the shopping option, including price, content and/or terms of the shopping option, redemption dates of an item discount, item features, inventory or availability of the item, merchant location/distance/map, or other relevant information. Based on the information, the user may determine if a purchase is preferable and/or advantageous to the user. If the user transmits a request to purchase the item, the user may utilize a payment provider to complete the purchase order. Additionally, the payment provider or merchant may provide the item, pick-up of the item, or delivery of the item. Thus, a transaction history may be sent to the merchant and/or the user as necessary. Where the shopping offer includes an item discount redeemed at time of purchase from a merchant (e.g., a discount coupon), the item discount may be received by the communication module and stored by the communication device.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant device 130, and a service provider server 140 in communication over a network 160. User 102, such as a consumer, may utilize user device 110 to enter shopping preferences, and view notifications for shopping options corresponding to the shopping preferences. Shopping preferences may be received from service provider server 140 utilizing the shopping preference, attributes received for user 102, and/or information available from merchant device 130.

User device 110, merchant device 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication between user device 110, merchant device 130, and/or service provider server 140. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a local shopping module 120, a digital wallet module 112, other applications 114, a database 116, and a communication module 118. Local shopping module 120, digital wallet module 112, and other applications 114 may correspond to executable processes, procedures, and/or applications with associated hardware, such as device modules. In other embodiments, user device 110 may include additional or different hardware and software as required.

Local shopping module 120 may correspond to one or more processes to execute modules and associated devices of user device 110 to provide notifications for shopping options (e.g., purchase offers, such as item sales, discounts, etc.) to user 102 based on shopping preferences of user 102. In this regard, local shopping module 120 may correspond to specialized hardware and/or software utilized by user device 110 to receive shopping preferences of user 102 through user input and transmit the preference for processing with user attributes, such as by merchant device 130 and/or service provider server 140. In various embodiments, local shopping module 120 may receive shopping preferences from data in database 116 stored to a non-transitory memory of user device 110. Further, local shopping module 120 may scrape data from one or more social accounts/feeds corresponding to user 102, such as a social networking feed, microblogging service, or other service. The shopping preferences may correspond to a commerce website, a merchant brand, merchant location, an item, and an item category. For example, shopping preferences may correspond to desired items for purchase, desired item discounts including categories of discounts and/or specific item discounts, or preferred merchants. Shopping preferences may further include user set parameters corresponding to the shopping preferences, such as a proximity for a merchant location near the location information, a price point for an item, item type, category of products, and/or general price point, a type, maximum price, and/or redemption terms of an item discount, or other user established parameter.

Local shopping module 120 may also access attributes for user 102. In various embodiments, the attributes for user 102 may include location information, which may be received from a component of user device 110 (e.g. a GPS or other location determining module/component) or from a location determining application or service (e.g., a mapping application or online mapping service. The location information may instead be set by the user, such as a home address, work address, or other location. However, in other embodiments, local shopping module may be utilized to check-in to merchant locations, for example, using a social networking service or a check-in service. For example, local shopping module 120 may be configured to establish user 102 as located at the merchant location through an online check-in/social networking service. In certain embodiments, local shopping module 120 may correspond to a specific application utilized by user device 110 with a merchant device/service, such as merchant device 130, to connect to merchant device 130 and alert the merchant that user device 110 is in proximity to merchant device 130. In such embodiments, local shopping module 120 of user device 110 may utilize short range wireless communication with merchant device 130, such as near field communication, Bluetooth, Bluetooth Low Energy, radio, infrared, or other connection, in order to establish the location of user 102. Attributes for user 102 may also include user preferences and/or personal information. For example, the attributes may further include a mode of transportation for user 102 and/or an account balance for user 102, which may further be utilized by service provider server 140 when determining shopping notifications, as will be discussed in more detail herein.

Local shopping module 120 may receive one or more notifications corresponding to the shopping preferences. The notifications may include a shopping option, such as purchase offers for an item corresponding to the plurality of shopping preferences, an item discount corresponding to the plurality of shopping preferences, and a merchant location corresponding to the plurality of shopping preferences. For example, one set of notifications may display items matching the shopping preferences. Another set of notifications may include item discounts matching the shopping preferences. A third set of notifications may include merchants in proximity to the location information, such as merchants nearby user 102 that offer items corresponding to the shopping preferences. Notifications may be transmitted to user device 110 for display to user 102 generally, as soon as the notification is created, at set time intervals, at a price of an item, for an item discount corresponding to the plurality of shopping options, based on a user location, and/or based on a merchant location. User attributes and/or the shopping preferences may determine when the notification are transmitted to user device 110 and/or presented to user 102.

Each set of notifications may be grouped in local shopping module 120 or may be presented generally through an application interface of local shopping module 120. Local shopping module 120 may display the shopping notifications as one or more cells determined from the shopping preference(s). A cell may correspond to a section of an interface having the shopping information(s) included in the section. The application interface may appear as a table or modified table having one or more cells, where each cell displays a purchasable item. For example, a cell may correspond to a portion of an application interface window having shopping notifications determined from the shopping preferences. Additionally, the cell may provide interactivity, such as linking to a merchant website and/or item offer corresponding to the shopping option. A cell may include the purchase offer in the shopping notifications, as well as additional information, including merchant information for the first merchant, merchant location information for the first merchant, merchant inventory information for the first merchant, a cost for the at least one first purchase offer, item information for the first item, an item discount for the first item, terms of purchase for the at least one first purchase offer, a wait time at the first merchant, and delivery information for the first item by the first merchant. Such additional information may also be displayed on selection of the cell and may be hidden from initial view prior to the selection of the cell.

The shopping notifications in the cell(s) may be displayed according to the shopping preferences and/or user attributes. For example, if a shopping preference is for a lower value for an item, the merchant offering the item at a lowest price may be presented in the cell(s). Thus, the item offered in the cell(s) may maximize user 102's potential savings. In various embodiments, local shopping module 120 may present the cell(s), such as during execution of local shopping module 120. However, the cell(s) may also be presented through an operating system interface background of user device 110 or through other means, such as a toolbar or scrollbar on an application interface of user device 110. Moreover, the cell(s) determined from shopping preferences may be utilized to determine one or more other shopping notifications and cell(s). For example, the subject of a shopping notification in a first cell may be used to determine one or more second shopping notifications. The subject may correspond to a travel location, a merchant service, a merchant good, and/or a user location. These subjects may be used to determine the second cells, such as offering hotels or other travel arrangements, clothes, sightseeing, food, or other items related to the subject of the first cell.

A shopping notification may also include a purchase option, such as a button, or instructions to transmit a purchase request to merchant device 130 and/or service provider server 140. Thus, merchant device 130 and/or service provider server 140 may receive a purchase request corresponding to purchase offer in the shopping notification and complete the request. The purchase request may correspond to a purchase of an item for delivery (e.g. through an online marketplace), an item discount purchase or request to receive/redeem the item discount, and/or a purchase of an item for pick-up at a merchant location (e.g. a food good and/or service).

Where the purchase order is completed with merchant device 130, merchant device 130 may offer an item to user 102 at a merchant location, and arrange a delivery of the item to user 102, and/or may transmit an item discount to user 102 for use at a merchant location. Thus, in various embodiments, a merchant location corresponding to the purchase order may be displayed to user 102 or shipping information may be displayed to user 102. If service provider server 140 completes the purchase order by providing payment to merchant device 130, a transaction history may be transmitted to user device 110 and/or merchant device 130 to in order to facilitate user 102 receiving the item, picking-up the item, and/or receiving and redeeming the item discount.

Digital wallet module 112 may correspond to one or more processes to execute modules and associated devices of user device 110 to provide a convenient interface to permit user 102 to select payment options and provide payment for items and/or services. For example, digital wallet module 112 may correspond to specialized hardware and/or software utilized by user device 110 to present a user interface enabling the user to enter payment options for storage by user device 110, provide payment options on checkout/payment of an item/service, and complete a transaction for the item/service. In some embodiments, digital wallet module 112 may correspond more generally to a web browser configured to view information available over the Internet or access a website corresponding to a payment/wallet application. Digital wallet module 112 may utilize user financial information, such as a credit card, bank account, or other financial account. Additionally, digital wallet module 112 may provide payment for items using a user account with service provider server 140. Digital wallet module 112 may further include options to store transaction history for purchased items, such as receipts, for later use (e.g. redemption at a merchant location for an item and/or item discount). Thus, digital wallet module 112 provides an interface enabling user 102 to provide proof of purchase of an item to a merchant.

Digital wallet module 112 may provide payment for a purchase order by user 102. Payment may be provided over network 160, so that user 102 may have an item corresponding to the purchase order shipped, visit a merchant location corresponding to the item and pick-up or redeem a credit for the item, and/or receive an item discount voucher for use at a merchant location. Additionally, digital wallet module 112 may provide payment directly to a merchant device 130 instead of using service provider server 140. For example, digital wallet module 112 may utilize stored user financial information to complete a purchase order. Digital wallet module 112 and/or local shopping module 120 may provide other features for purchase of the item, such as a hold request, notification of stock and/or wait times, and/or notification of other merchant locations to pick-up/purchase the item.

In various embodiments, local shopping module 120 and digital wallet module 112 may be incorporated in the same module(s) so as to provide their respective features in one convenient device interface.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with service provider server 140. As previously discussed, other applications 114 may include mapping applications, for example, through a GPS module and/or communication module 118 that may identify user 102 at a location and/or calendaring/scheduling applications, which may be utilized to determine a route user 102 is travelling. Additionally, other application may include social media applications. Other applications 114 may include device interfaces and other display modules that may receive input from user 102 and/or output information to user 102. For example, other applications 114 may contain software programs, executable by a hardware processor, including a graphical user interface (GUI) configured to provide an interface to the user.

User device 110 may further include database 116 which may include, for example, identifiers such as operating system registry entries, cookies associated with local shopping module 120, digital wallet module 112, and/or other applications 114, identifiers associated with hardware of user device 110, or other appropriate identifiers, such as identifiers used for payment/user/device authentication or identification. In one embodiment, identifiers in database 116 may be used by merchant device 130 and/or service provider server 140 to associate user device 110 with a particular account maintained by the payment/credit provider. Thus, database 116 may include user personal information (e.g. a name, social security number, user financial information, or other identifying information), a user account identifier, and a user device identifier. In various embodiments, database 116 may include online account access information. Database 116 may store entered information, such as shopping preferences, user attributes, and/or user payment/financial information as well as received information, including shopping notifications and transaction histories. Database 116 may also store user preferred locations, merchants, items, user shopping preferences, and/or user established parameters.

In various embodiments, user device 110 includes at least one communication module 118 adapted to communicate with merchant device 130 and/or service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with merchant device 130 using short range communications, such as Bluetooth Low Energy, LTE Direct, WiFi, radio frequency, infrared, Bluetooth, and near field communications.

Merchant device 130 may be maintained, for example, by a merchant or seller offering various items, products, and/or services through in-store and/or through an online site or application. Generally, merchant device 130 may be maintained by anyone or any entity that receives money, for example, retailers and restaurants. In this regard, merchant device 130 may include one or more merchant modules to facilitate the sale of products, goods, and/or services. Merchant device 130 may be implemented using any appropriate hardware and software configured for wired and/or wireless communication between user device 110, merchant device 130, and/or service provider server 140. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although only one merchant device is described, a plurality of merchant devices may function similarly. Although merchant device 130 and service provider server 140 are shown as separate entities, it is understood they may be incorporated as the same entity. In other embodiments, one or more service offered by merchant device 130 and/or service provider server 140 may be provided in the same entity, such as notification determination module 150.

Merchant device 130 includes a merchant module 132, other applications 134, a database 136, and a communication module 138. Merchant module 132 and other applications 134 may correspond to executable processes, procedures, and/or applications with associated hardware, such as device modules. In other embodiments, user device 110 may include additional or different hardware and software as required.

Merchant device 130 may include merchant module 132, which may correspond to one or more processes to execute modules and associated devices of user device 110 to serve information over network 160 to user device 110 and/or service provider server 140. In one embodiment, shopping options may be determined using items and/or item discounts available with merchant module 132. Thus, merchant module 132 may correspond to specialized hardware and/or software utilized by merchant device 130 to transmit information for use in shopping notification displayed to user 102 using local shopping module 120 as previously discussed. The information may include shopping options, such as purchase offers, which may be transmitted directly to user device 110 and/or to service provider server 140 for determination of notifications. Purchase offers may include sale offers for items available through merchant module 132, item discounts (e.g. coupon, rebates, discounts, purchase cards, clustered deals, etc.), and/or other item sale information. Information for purchase offers may be pulled by user device 110 and/or service provider server 140 generally based on available information with merchant module 132 and using the shopping preferences for user 102. However, merchant module 132 may also generate targeted marketing, such as item discounts for user 102, based on received information. For example, user device 110 and/or service provider server 140 may alert merchant module 132 of a shopping notification displayable to user 102, which may include an item sale offer or discount with the merchant corresponding to merchant device 130 or another merchant. Merchant module 132 may tailor another purchase offer in order to incentivize sales to user 102 using the shopping notification. Merchant module 132 may transmit the tailored offer to service provider server 140 for transmission to user 102 based on a location of user 102. However, in other embodiments, merchant module 132 may transmit the offers directly to user 102, for example, if user device 110 is in communication with merchant device 130.

Additionally, user 102 may utilize local shopping module 120 to interact with merchant module 132 to view various items available for purchase from the merchant. Thus, merchant module 132 may include a marketplace interface displayable on user device 110. However, in other embodiments, merchant module 132 may correspond to a browser or other internet access utility for use by merchant device 130 to transmit products, goods, and services to user device 110 and/or service provider server 140 for use in shopping notifications for local shopping module 120. In such embodiments, merchant device 130 may utilize local shopping module 120 as a marketplace utility.

In various embodiments, merchant module 132 may be configured to provide a convenient interface to permit user 102 to complete a transaction for an item with user 102. For example, merchant module 132 may be implemented as an application having an interface enabling user 102 to purchase items and/or item discounts available at a merchant corresponding to merchant device 130. Thus, merchant module 132 may include an interface displaying user selected items. In some embodiments, merchant module 132 may arrange delivery of an item to user 102, including shipping and shipping payment. In other embodiments, merchant module 132 may transmit transaction histories to user device 110 for storage and/or redemption at a merchant location. Merchant module 132 may also be utilized to access merchant websites and engage in online transactions, for example, checking/finding inventory purchased by a user available at the merchant location or different merchant locations.

In various embodiments, merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 160, or other types of applications. In various embodiments, other applications 134 may include financial applications, such as banking, online payments, money transfer, or other applications associated with service provider server 140. As previously discussed, other applications 134 may include check-in applications configured to establish a short range wireless connection with user device 110 and/or process a check-in for user 102 at a merchant location corresponding to merchant device 130. Other applications 114 may include device interfaces and other display modules that may receive input from a merchant and/or merchant employee and output an interface. For example, other applications 134 may contain software programs, executable by a hardware processor, including a graphical user interface (GUI) configured to provide an interface to the user.

User device 110 may further include database 136 which may include, for example, identifiers such as operating system registry entries, cookies associated with merchant module 132 and/or other applications 134, identifiers associated with hardware of merchant device 130, or other appropriate identifiers, such as identifiers used for payment/user/device authentication or identification. In one embodiment, identifiers in database 136 may be used by a user device 110 and/or service provider server 140 to associate merchant device 130 with a particular account maintained by the payment/credit provider. Thus, database 136 may include merchant information, a user account identifier, and a user device identifier. Database 136 may information utilize by merchant module 132 in order to provide purchase offers in shopping notifications to user 102, such as item prices, inventory levels, sales, discounts, and/or other item information. Database 136 may also store information received from user device 110, including shopping notifications provided to user 102, transaction histories for purchased items, and/or delivery information.

In various embodiments, merchant device 130 includes at least one communication module 138 adapted to communicate with user device 110 and/or service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with merchant device 130 using short range communications, such as Bluetooth Low Energy, LTE Direct, WiFi, radio frequency, infrared, Bluetooth, and near field communications.

Service provider server 140 may be maintained, for example, by an online service provider, which may provide shopping notification services to user 102. Service provider 140 may further provide user account services to user 102, including payment services through a payment account. In this regard, service provider server 140 includes one or more processing modules, which may provide shopping notifications and payment for items between user device 110 and merchant device 130. In one example, service provider server 140 may be provided by EBAY®, Inc. of San Jose, Calif., USA or PAYPAL®, Inc. of San Jose, Calif., USA. However, in other embodiments, service provider server 140 may be maintained by or include a merchant, financial services provider, and/or other service provider, which may provide shopping notifications and/or purchase service to user 102. Although a single service provider is shown, multiple service providers may function similarly. Although merchant device 130 and service provider server 140 are shown as separate entities, it is understood they may be incorporated as the same entity. In other embodiments, one or more service offered by merchant device 130 and/or service provider server 140 may be provided in the same entity, such as notification determination module 150.

Service provider server 140 of FIG. 1 includes a notification determination module 150, a transaction processing module 142, other applications 144, a database 146, and a network interface component 148. Notification determination module 150, transaction processing module 142, and other applications 144 may correspond to processes, procedures, and/or applications executable by a hardware processor, for example, a software program. In other embodiments, service provider server 140 may include additional or different software as required.

Notification determination module 150 may correspond to one or more processes to execute modules and associated devices of service provider server 140 to provide shopping notifications to local shopping module 120, such as shopping options (e.g., purchase offers) based on user 102's shopping preferences. In this regard, notification determination module 150 may correspond to specialized hardware and/or software utilized by service provider server 140 to receive shopping preferences from user 102 and determine one or more shopping notifications based on the shopping preferences. Notifications may include one or more purchase offers from the merchant corresponding to merchant device 130. Notification determination module 150 may transmit the notification(s) to user device 110 for output using local shopping module 120. When notification determination module 150 receives a selection of one of the notifications, additional information may be populated to user 102. The additional information may be contained within the initial shopping preference, or a request for additional information may be received and processed by notification determination module 150. The additional information may assist user 102 with transmitting a purchase order, which may be processed with merchant device 130 0.

Notification determination module 150 may further receive location information and other attributes of user 102 and determine the shopping preferences using the attributes. Notification determination module 150 may receive the location information without user 102's input to user device 110. For example, user device 110 may passively monitor location information of user 102 and transmit the location information to service provider server 140. Thus, notification determination module 150 may utilize location information to determine merchants in proximity to user 102 as user 102 changes locations and travels into proximity to a matching merchant. Notification determination module 150 may determine merchants are in proximity to user 102 using additional parameters, such as user preferences on merchant distance, in the shopping preferences. For example, user 102 may wish to only travel to merchants within a one mile radius of the location information. Notification determination module 150 may also estimate time to travel to a merchant based on the travel method of user 102 using a mode of transportation, such as walking, biking, or driving a car. Notification determination module 150 may also receive additional shopping preferences and/or attributes limiting or specifying merchants to search for in proximity to user 102. For example, user 102 may wish to only find coffee stores offering item discounts, restaurants with item discounts, etc.

Additionally, notification determination module 150 may receive marketing from merchant device 130, including item discounts and/or specialized purchase offers for user 102. Thus, a shopping notification generated with one merchant may also be transmitted to at least one other merchant. The other merchant may then be able to perform a price matching, a lower price, or a price reduction to the user. Thus, the user may obtain a best price for the item and merchants may gain additional business from users that would not normally know of potential price savings with that merchant. Notification determination module 150 may utilize the item discounts to determine the merchants to transmit to user device 110. In various embodiments, all merchants offering item discounts in proximity to user 102 may be transmitted to user device 110. However, in other embodiments, only merchants offering specific item discounts (e.g. an amount or type), specific merchants, and/or a combination of the two, may be transmitted to user device 110. Notification determination module 150 may transmit a distance, map, directions, address, and/or link to a map to user device 110 for user with the shopping notification.

Merchant location and marketing application 131 may also check user 102 into locations user 102 travels to when the user attempts to perform a purchase. For example, user 102 may travel to a merchant offering an item discount. When user 102 arrives at the merchant and/or when user 102 attempts to purchase an item at the merchant using the item discount, user 102 may be "checked-in" or identified with the location of the merchant. The check-in may be posted to a social networking application of user 102, transmitted to a server of the merchant, or otherwise used to save a history of user 102 at a location of the merchant.

Transaction processing module 142 may execute one or more modules of service provider server 140 to receive and/or transmit information from user device 110 and merchant device 130 for processing and completion of financial transactions for item with a merchant corresponding to merchant device 130. In this regard, network interface component 158 may receive a request to complete a sale transaction for one or more items from user device 110 and/or merchant device 130. The request may correspond to a payment from user device 110 to merchant device 130. The payment may include a user account identifier (e.g., a payment account for user 102 with payment provider server 140) or other payment instrument (e.g. a credit/debit card or checking account). Additionally, the payment may include a payment amount and terms of payment. Transaction processing module 142 may complete the transaction by providing payment to merchant device 130 and/or a payment account corresponding to merchant device 130. Additionally, transaction processing module 142 may utilize network interface component 158 to provide transaction histories, including receipts, to user device 110 and/or merchant device 130 for completion and documentation of the financial transaction.

In various embodiments, service provider server 140 includes other applications 144 as may be desired in particular embodiments to provide features to service provider server 140. For example, other applications 144 may include security applications for implementing server-side security features, programmatic server applications for interfacing with appropriate application programming interfaces (APIs) over network 160, or other types of applications. Other applications 144 may contain software programs, executable by a processor, including a graphical user interface (GUI), configured to provide an interface to a user.

Additionally, service provider server 140 includes database 146. As previously discussed, user 102 may establish one or more user accounts with service provider server 140. User accounts in database 146 may include user information, such as name, address, birthdate, payment/funding information, additional user financial information, and/or other desired user data. User 102 may link user accounts to user device 110 through a user device identifier. Thus, when a device identifier corresponding to user device 110 is transmitted to service provider server 140, e.g. from user device 110 and/or merchant device 130, a user account belonging to user 102 may be found. In other embodiments, user 102 may not have previously established a user account.

In various embodiments, service provider server 140 includes at least one network interface component (NIC) 135 adapted to communicate with network 160 including user device 110 and/or merchant device 130. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
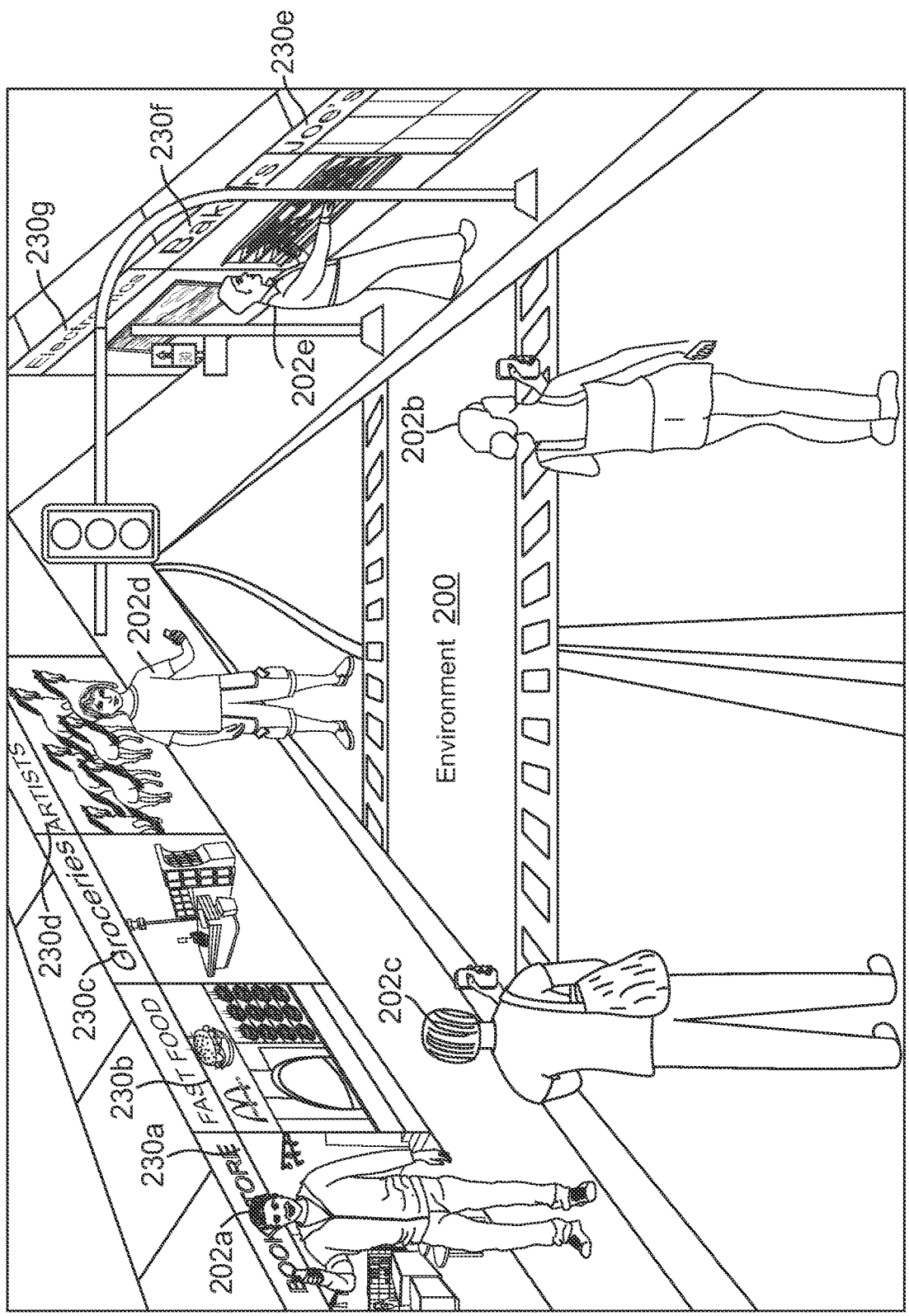
FIG. 2 is an exemplary environment having users at or nearby merchant locations offering items matching the users' shopping preferences, according to an embodiment.

FIG. 2 is an exemplary environment having users at or nearby merchant locations offering items matching the users' shopping preferences, according to an embodiment. An environment 200 of FIG. 2 includes a user 202a, a user 202b, a user 202c, a user 202d, and a user 202e all corresponding generally to user 102 of FIG. 1. Moreover, environment 200 includes a merchant 230a, a merchant 230b, a merchant 230c, a merchant 230d, a merchant 230e, a merchant 230f, and a merchant 230g corresponding to merchants that may utilize devices and/or servers corresponding generally to the described modules and features of merchant device 130 for use in providing users 202a-e with shopping notifications.

Environment 200 may correspond to some shopping environment, such as a merchant shopping mall location, a city with a plurality of merchants, or other area where multiple merchants may be found and accessed to purchase items from. Thus, users 202a-e may shop with any of merchants 230a-g either physically at the merchant's location or online through a merchant website or service provider. Each of users 202a-e may possess a user device, such as a communication device (e.g., a mobile smart phone, tablet computer, etc.) while they travel through environment 200. As previously discussed, user devices may include a local shopping module that allows each of users 202a-e to enter their shopping preferences and receive shopping notifications. Further the local shopping module may utilize user attributes for users 202a-e when populating shopping notifications to users 202a-e.

Thus, as user 202a travels through environment 200, user 202a may view shopping notifications for one or more of merchants 230a-g. For example, user 202a may set an item preference that offers an item from merchant 230a. Since user 202a is in proximity to merchant 230a, user 202a may view a shopping notification for the item using a user device while user 202a is nearby merchant 230a. Since no shopping preference for user 202a matches merchant 230b, user 202a may not receive shopping preferences on their user device for merchant 230b. Moreover, the shopping preference for merchant 230a may be communicated to merchant 230c, who may generate a purchase offer that incentivizes user 202a to shop at merchant 230c over merchant 230a. Such a purchase offer may further be communicated to user 202a's user device as a shopping notification.

User 202b may be seen inside merchant 230d and shopping with merchant 230d. In such an embodiment, user 202b may perform a check-in with merchant 230d, such as through a connection to a merchant device at merchant 230d and/or through a check-in with a check-in service provider for merchant 230d. Once the check-in is established for user 202b, user 202b may view shopping notifications for merchant 230d that incentivizes user 202b to purchase something with merchant 230d, such as an offer for an item matching a shopping preference and/or a discount of an item available with the merchant. Similarly, user 202c is shown as very close to merchant 230e. Although user 202c may not be inside merchant 230e, user 202c may be checked-in with merchant 230e by lieu of user 202c's proximity to merchant 230e. In order to entice user 202c to shop with merchant 230e, a shopping notification for user 202c matching their shopping preference and their check in may be communicated to user 202c's user device.

User 202d is shown as travelling nearby both merchants 230f and 230g. Both merchants 230f and 230g may offer a same or similar item for sale matching one or more shopping preferences of user 202d. Thus, user 202d may receive two shopping notifications for the item on user 202d's user device. The shopping notification may populate as one or more cells on an interface of the user device in possession of user 202d. Thus, user 202d may select the cell(s) to view additional information about the shopping notification, including the purchase offer and terms of the purchase offer (e.g., a price). User 202d may choose to continue and submit a request to purchase the item in one of the purchase offers. Once complete user 202d may then visit the merchant of merchants 230f and 230g in order to pick up the item using a transaction history for the item.

User 202e is shown as remote from all of merchants 230a-g. User 202e may be travelling by some mode of transportation that may dictate what shopping notifications are provided to user 202e. For example, if user 202e is travelling by an automobile, user 202e may easily visit any of merchants 230a-g. Thus, none of merchants 230a-g may be precluded in the shopping notifications. However, if user 202e is travelling by foot, the shopping notifications may be limited to merchants 230d-g and remove merchants 230a-c that would be too difficult or time consuming to reach. Moreover, delivery options set by user 202e in their shopping preferences may also dictate which of merchants 230a-g are searched for when generating shopping notifications. For example, if user 202e would like in store pick up, merchants 230a-c may be too far, while if user 202e is amenable to delivery or courier services, merchants 230a-c may be included.

Figure 3:
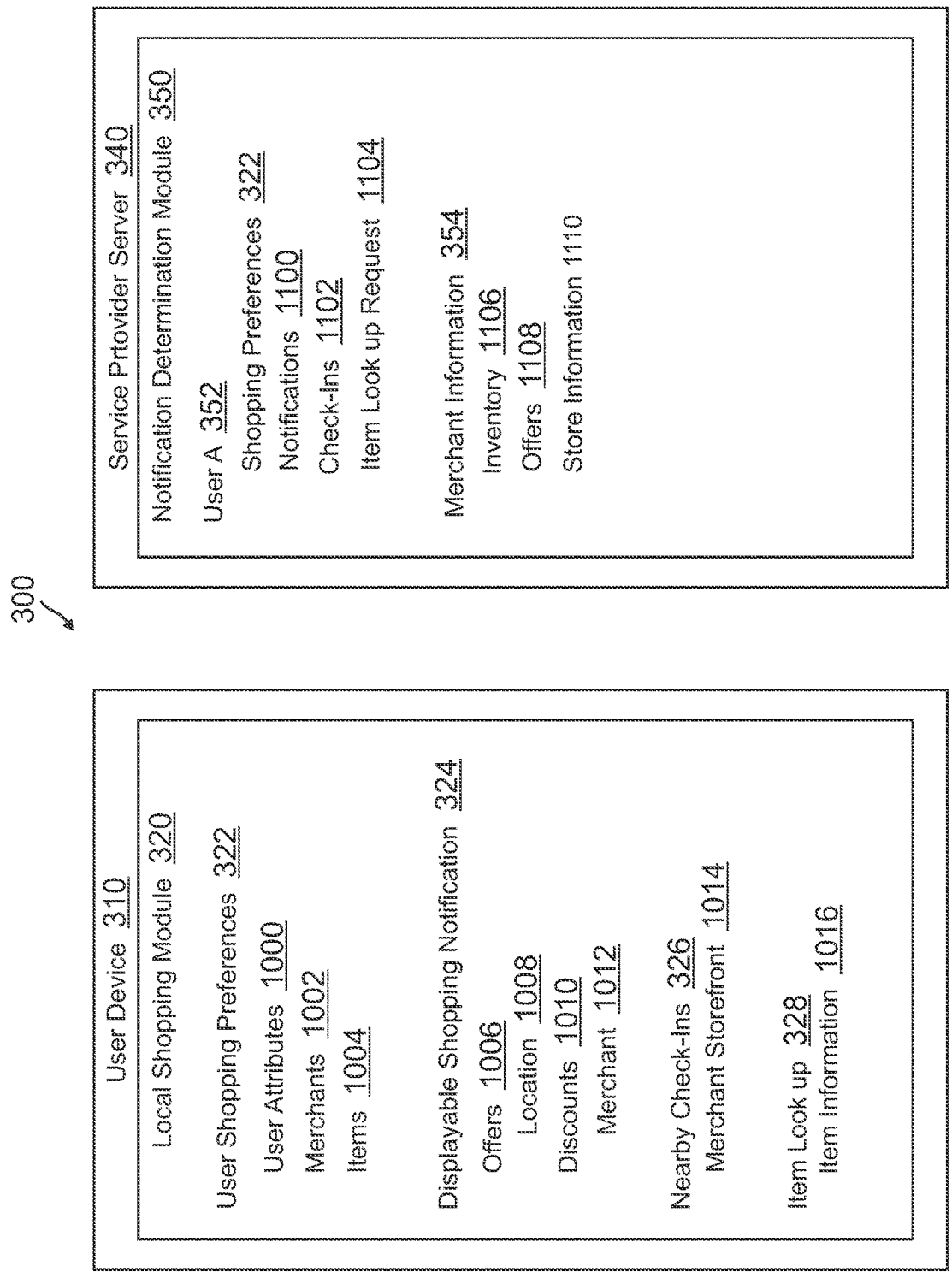
FIG. 3 is an exemplary system environment having a user device presenting shopping notification received from a service provider, according to an embodiment.

FIG. 3 is an exemplary system environment having a user device presenting shopping notification received from a service provider, according to an embodiment. Environment 300 of FIG. 3 includes a user device 310 and a service provider server 330 corresponding generally to user device 110 and service provider server 130, respectively, of FIG. 1.

User device 210 executes a local shopping module 320 corresponding generally to the specialized hardware and/or software modules and processes described in reference to local shopping module 120 of FIG. 1. Local shopping module 320 includes user shopping preferences 322 that may be entered by a user of user device 310 and/or scraped from available user information. Thus, user shopping preferences 322 include user attributes 1000, which may correspond to attributes about the user, such as a location, user account balance, and/or mode of transportation for the user. User shopping preferences 322 further include merchants 1002 that the user prefers to shop with. User shopping preferences 322 also includes items 1004 that the user wishes to purchase or has an interest in purchasing.

Local shopping module 320 includes displayable shopping notifications 324 determined by service provider server 340, as will be explained in more detail below. Local shopping module 320 may also establish nearby check-ins 326 having merchant storefront 1014 that the user is checked in to. Nearby check-ins 326 may be established through location modules of user device 310, connections to other devices, and/or check-in service providers. Local shopping module 320 also provides for item lookup 328 that may be utilized by the user of user device 310 to enter item information directly through an input module, including scanning of item information, such as a bar code, QR code, or other item identifier in item information 1016. Item lookup 328 may be utilized to determine a high priority shopping preference so that a user may determine whether the user wishes to purchase an item or if other items are available for better offers.

Notification determination module 350 may be utilized to determine and provide displayable shopping notifications 324 using received information under shopping preferences 322, nearby check-ins 326, and/or item lookup 328. Thus, notification determination module 350 corresponds generally to the specialized hardware and/or software modules and processes described in reference to notification determination module 150 of FIG. 1. In this regard, notification determination module 350 includes information for a user A 352 having shopping preferences 322 received from user device 310. User A 352 further includes determined notifications 1100, check-ins 1102, and an item lookup request. Notifications 1100 may be determined using shopping preferences 322, check-ins 1102, and/or item lookup request 1104. Notifications 1100 may also be determined using merchant information 354, such as inventory 1106 for a merchant, offers 1108 of the merchant, and store information 1110 of the merchant (e.g., location, hours, delivery options, etc.). Once notifications 1100 are determined and communicated to local shopping module 320, displayable shopping notifications 324 may populate one or more cells having offers 1006 with location 1008 and discounts 1010 with merchant 1012. The user of user device 310 may then select displayable shopping notifications 324 for additional information and/or processing or a request to purchase/obtain an item/discount.

Figure 4:
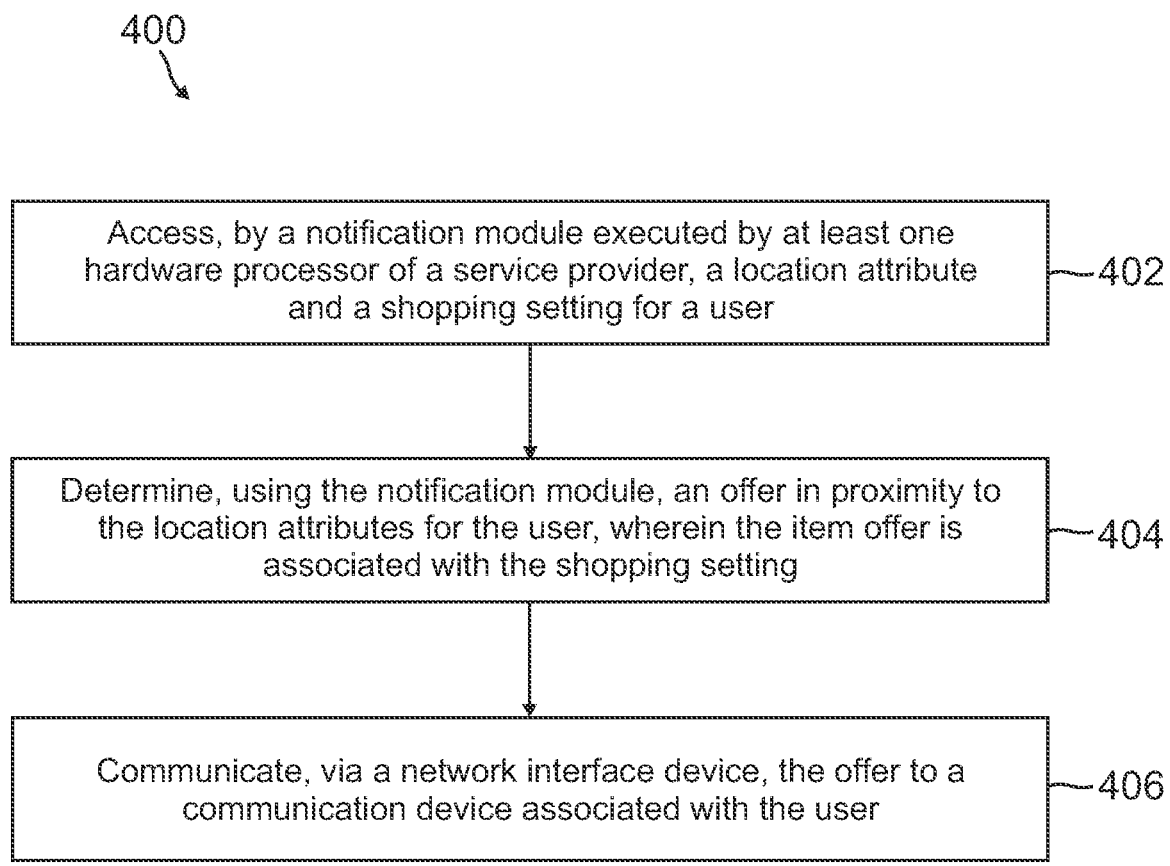
FIG. 4 is a flowchart of an exemplary process for presenting a communication device interface for merchant check-in and shopping notifications, according to an embodiment.

FIG. 4 is a flowchart of an exemplary process for presenting a communication device interface for merchant check-in and shopping notifications, according to an embodiment. Note that one or more steps, processes, and methods described herein may be omitted, performed in a different sequence, or combined as desired or appropriate.

At step 402, a location attribute and a shopping setting/preference is accessed, for example, by a merchant server and/or service provider server. The shopping preferences may correspond to desired items for purchase, desired item discounts including categories of discounts and/or specific item discounts, or preferred merchants. The shopping preferences may be received from a shopping application/module of a user device. The shopping application/module may receive the shopping preference from the user through user input, or may collect the information from a user database and/or through scraping user accounts, including online user accounts.

At least one offer is determined in proximity to the location attribute that matches the shopping setting/preference, at step 404, wherein the at least one offer includes a shopping option/purchase offer for an item matching the shopping setting/preference. The shopping option/purchase offer may correspond to an item corresponding to the plurality of shopping preferences, an item discount corresponding to the plurality of shopping preferences, and a merchant location corresponding to the plurality of shopping preferences. Additionally, the notification may be displayed to the user generally (e.g., on determination of the notification), at a predetermined time interval, or displayed to the user based on at least one of a price of an item, an item discount corresponding to the plurality of shopping options, user location, and or a merchant location.

At step 404, the offer is communicated to a communication device associated with the user. The user may use the device to make a selection of one of the at least one notifications received. The selection may correspond to a selection in the shopping application. Once the selection of a shopping notification is received, information corresponding to the shopping option is presented to the user. The information may correspond to item information, item discount information, merchant location information, merchant inventory information, terms of purchase information, price information, wait time information, and delivery information.

In various embodiments, a purchase order/request may be received for the purchase offer presented to the user. A merchant providing an item or item discount corresponding to the purchase offer may complete the request or a payment provider may complete the request by providing payment to the merchant. The user may receive a transaction history for use with the merchant, for example, to pick-up the item or redeem the item discount. In other embodiments, the transaction history may be transmitted to the merchant to arrange delivery of the item to the user.

Figure 5:
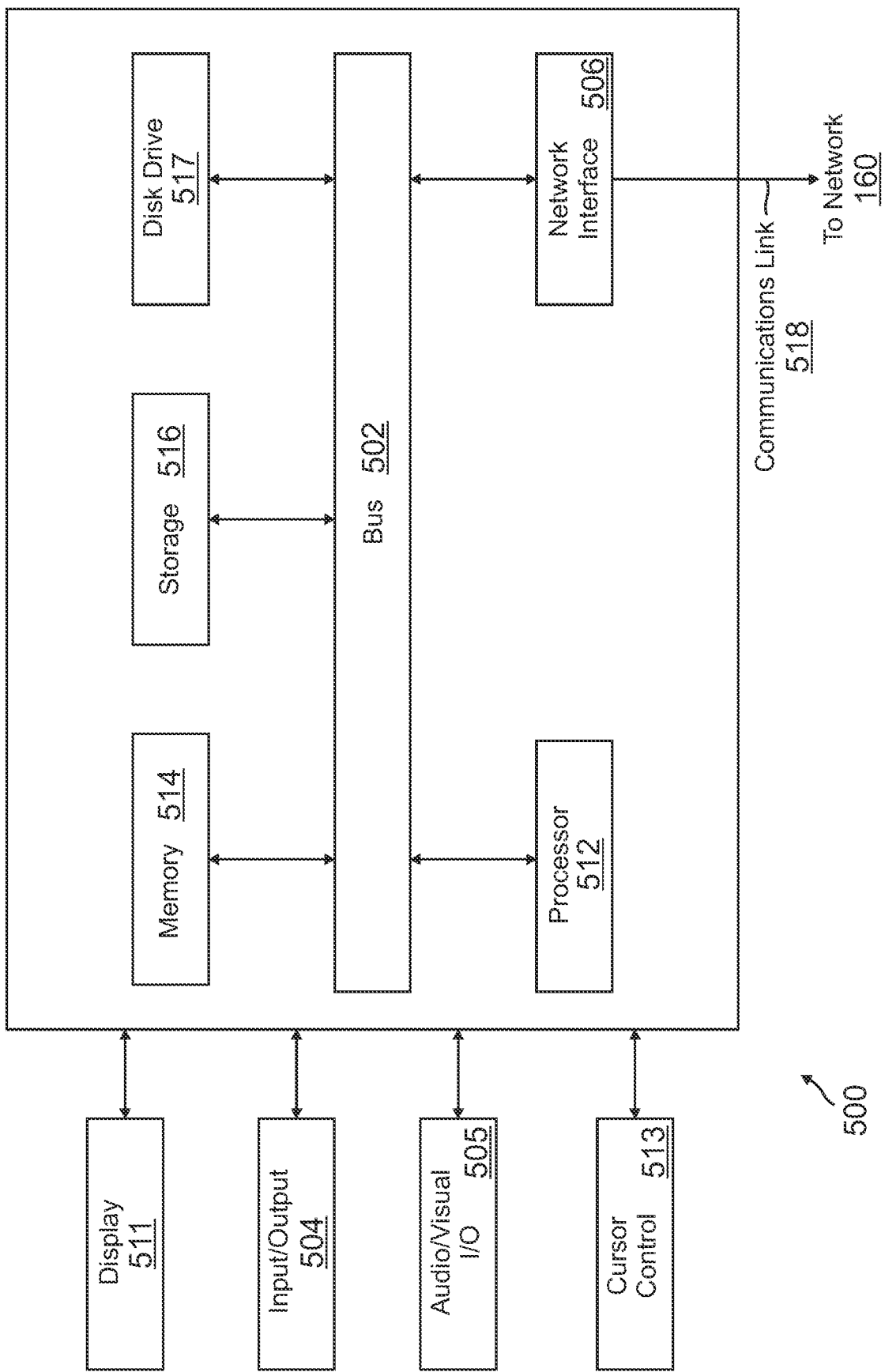
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 6A:
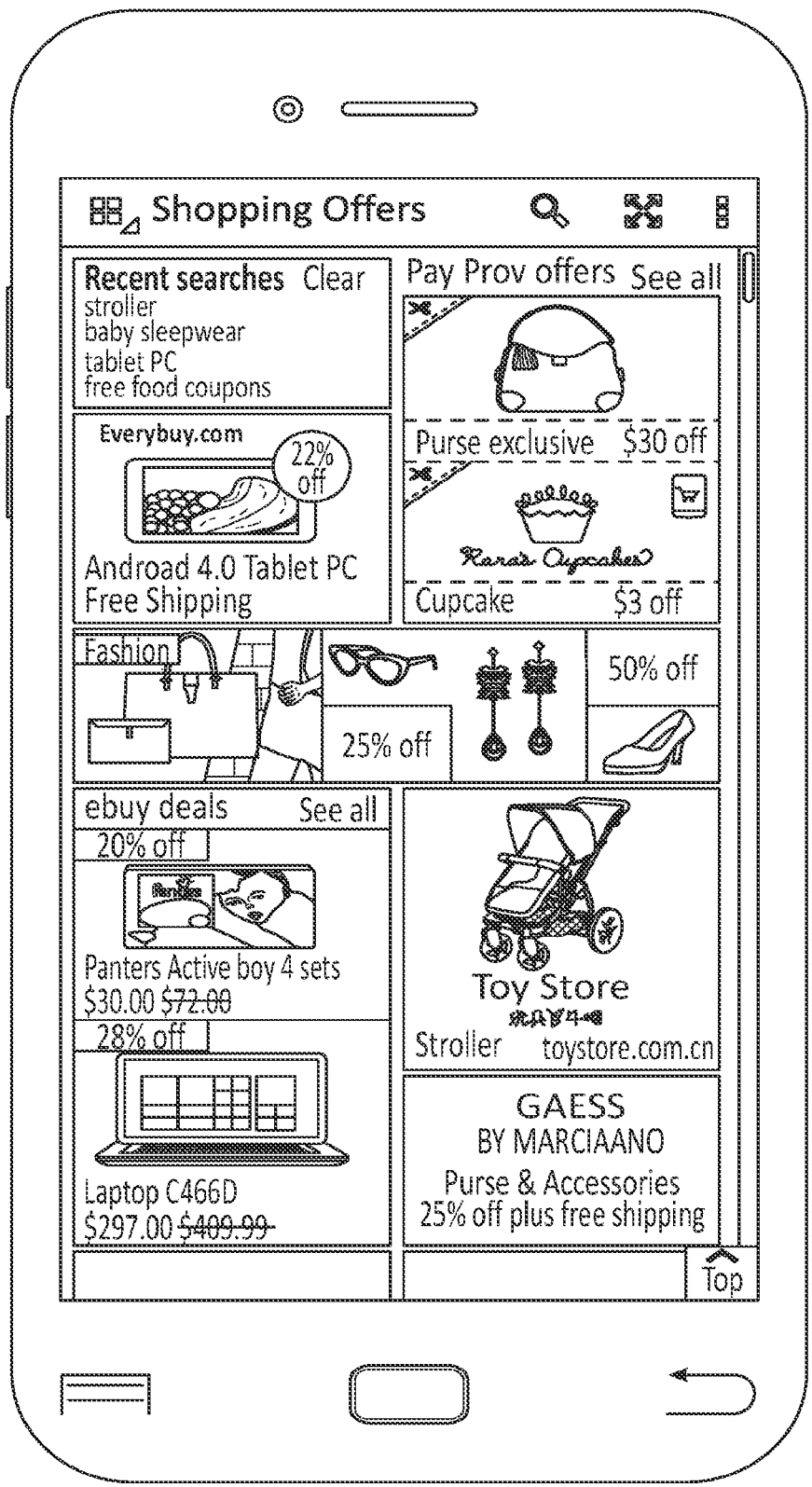
FIGS. 6A-6AH are exemplary screenshots of a communication device interface for presenting shopping notification to a user based on shopping preferences and user attributes, according to various embodiments.
Figure 6B:
Figure 6C:
Figure 6D:
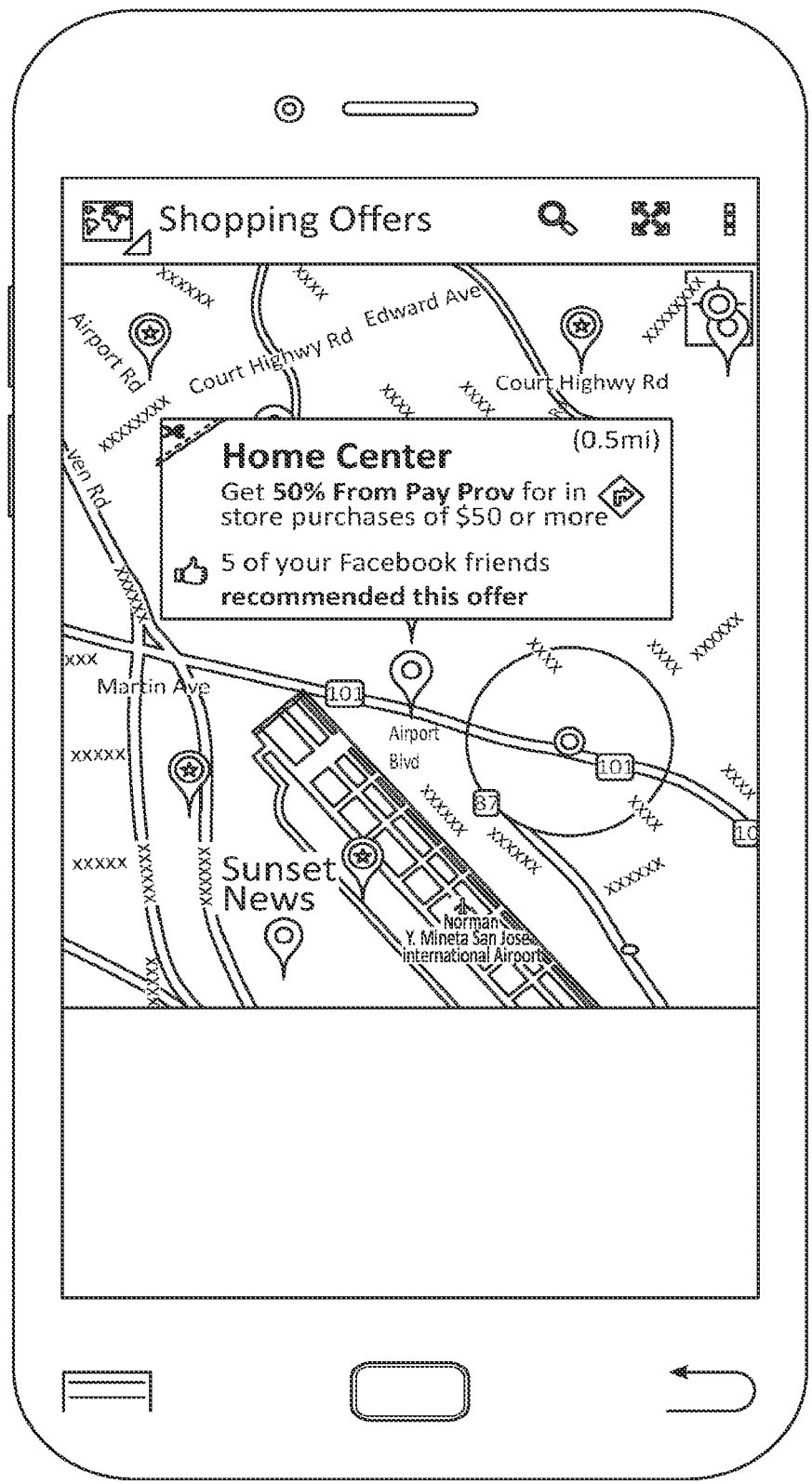
Figure 6E:
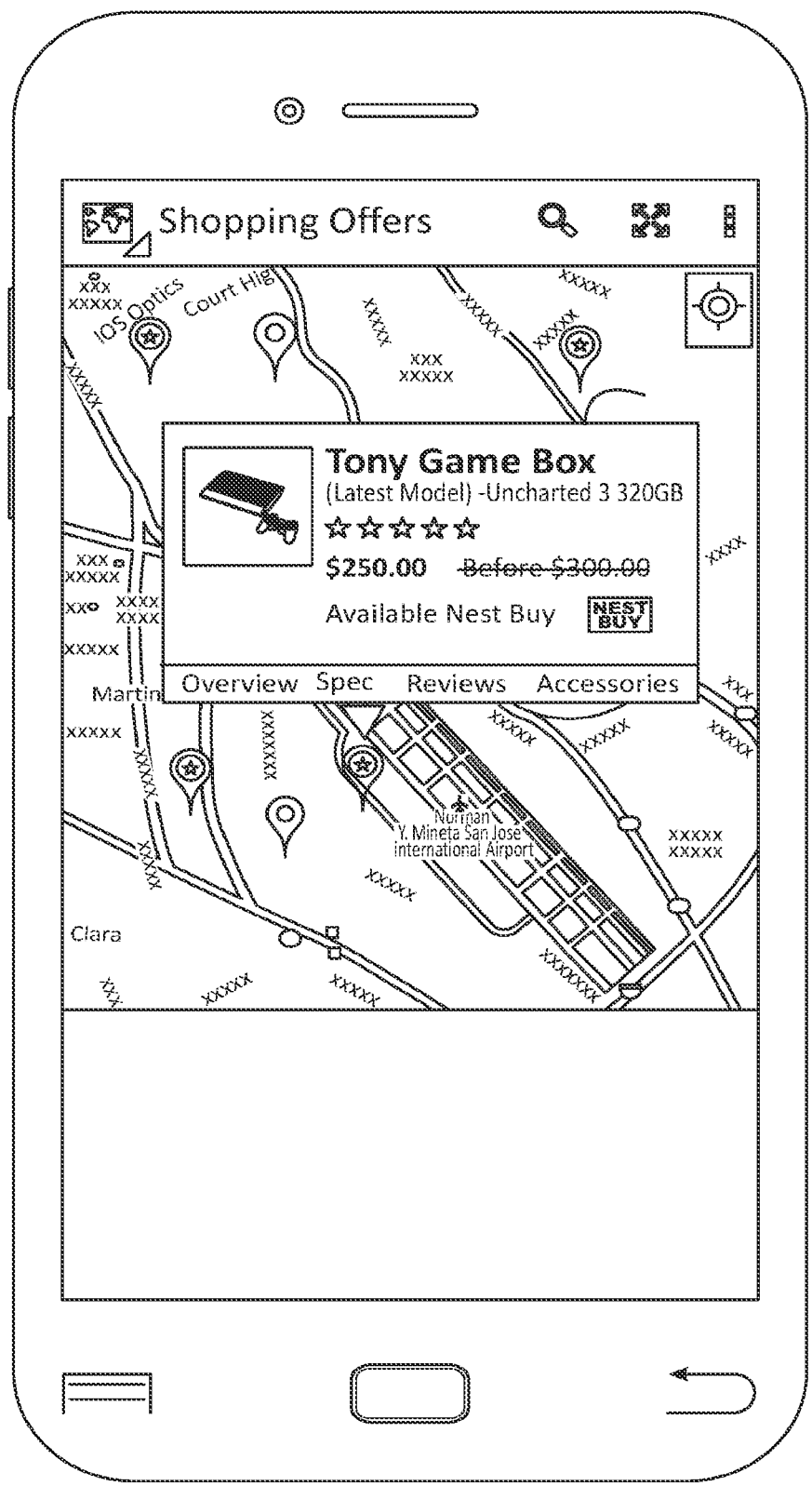
Figure 6F:
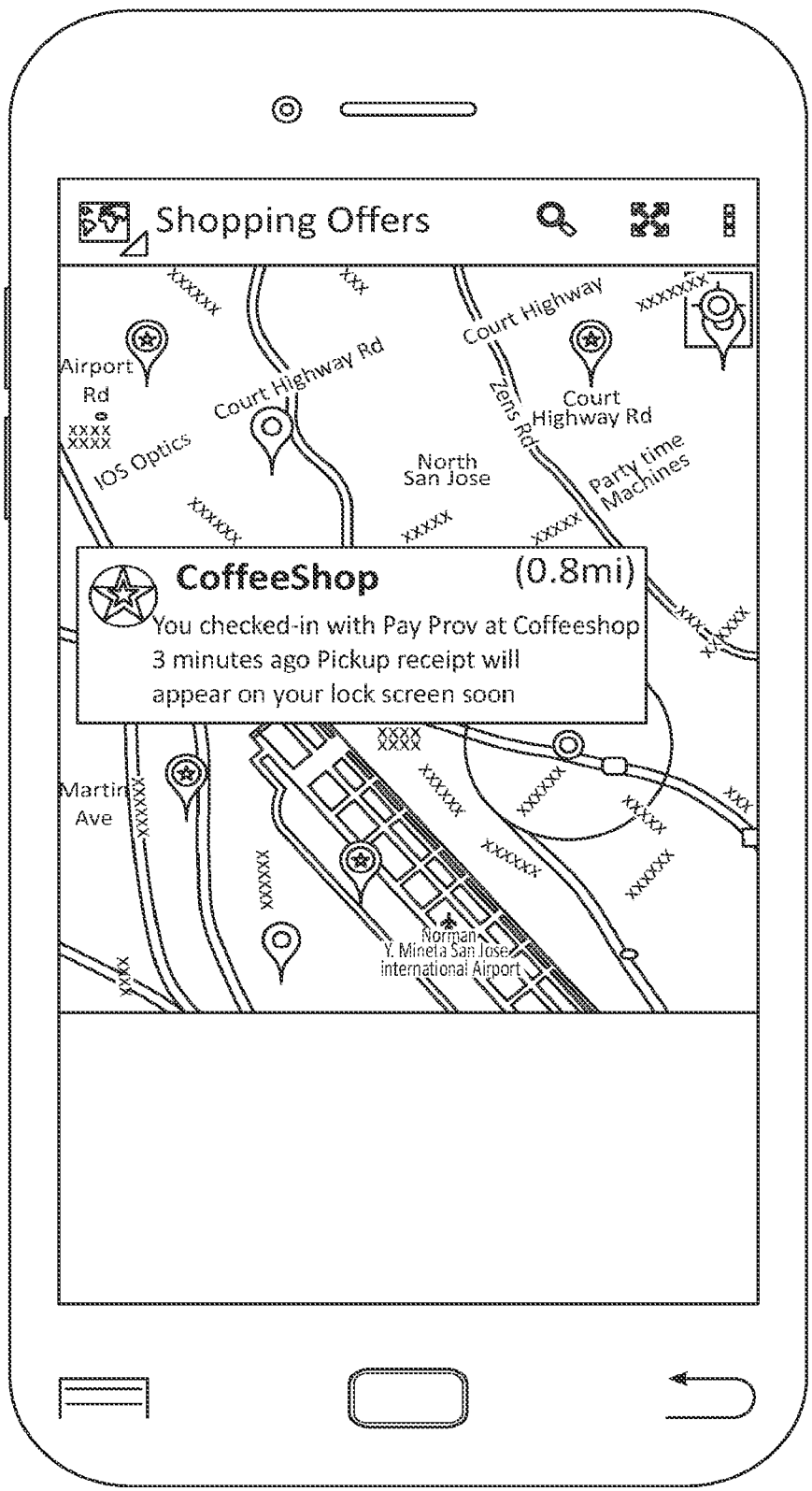
Figure 6G:
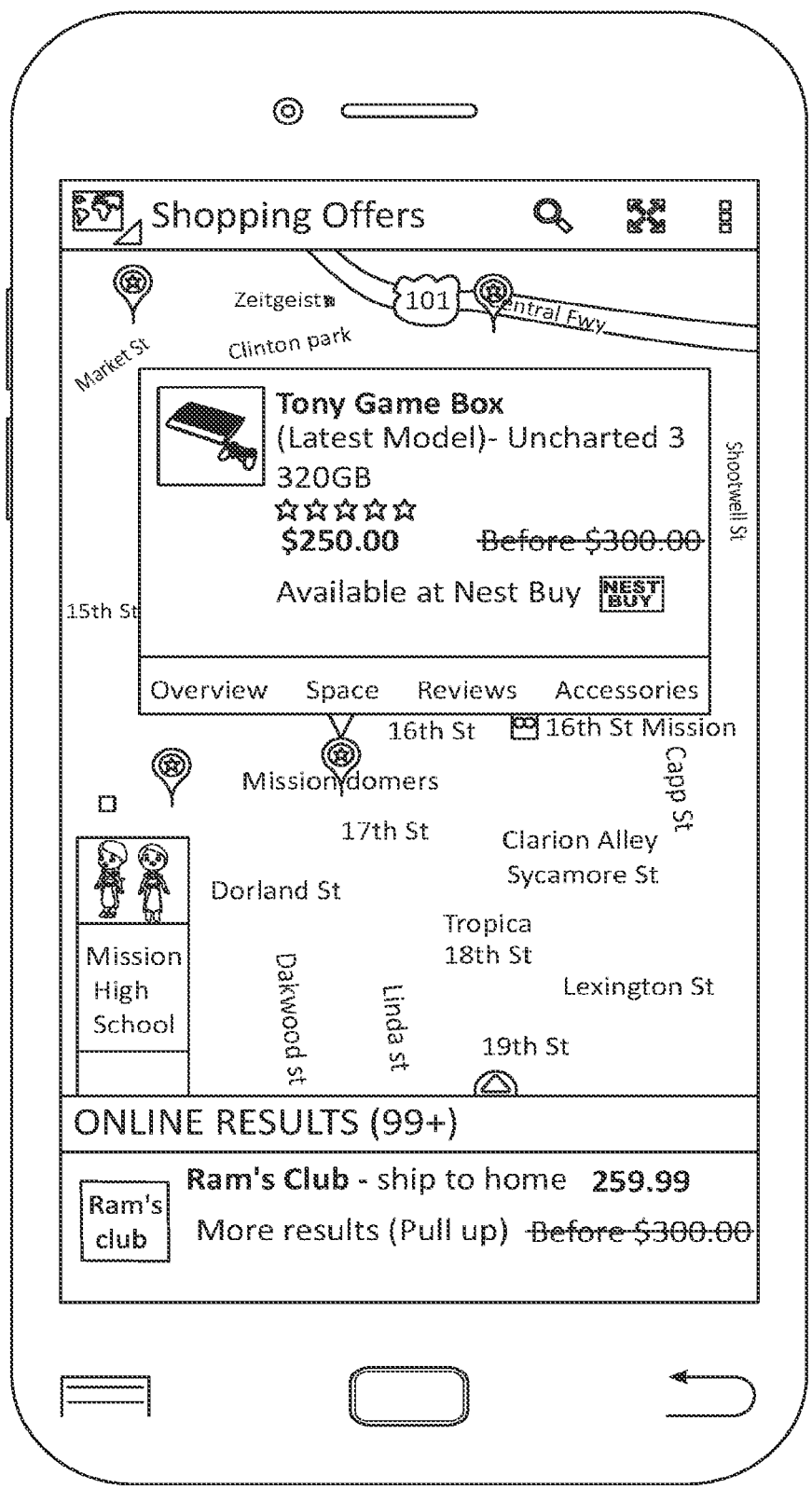
Figure 6H:
Figure 6I:
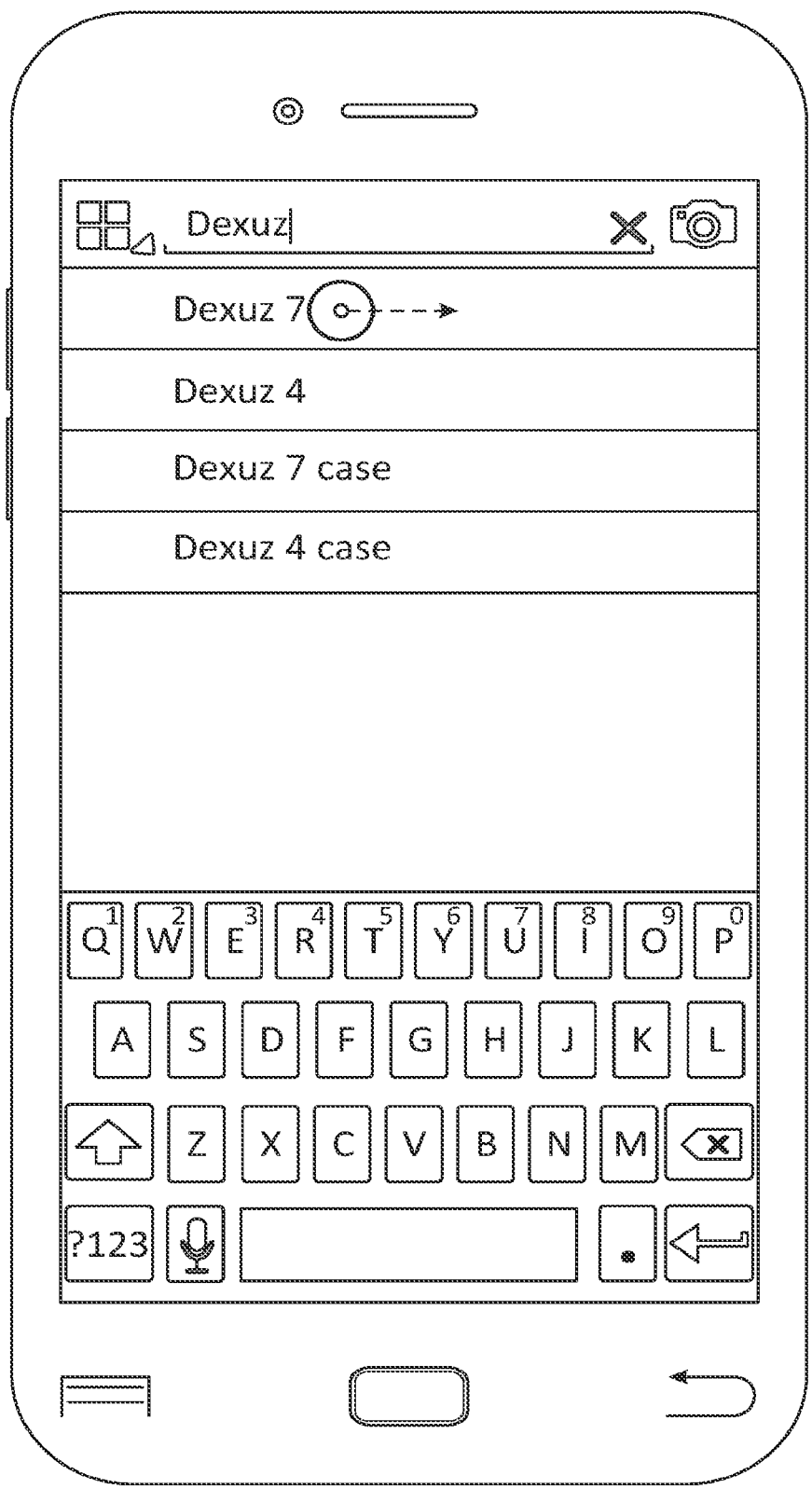
Figure 6J:
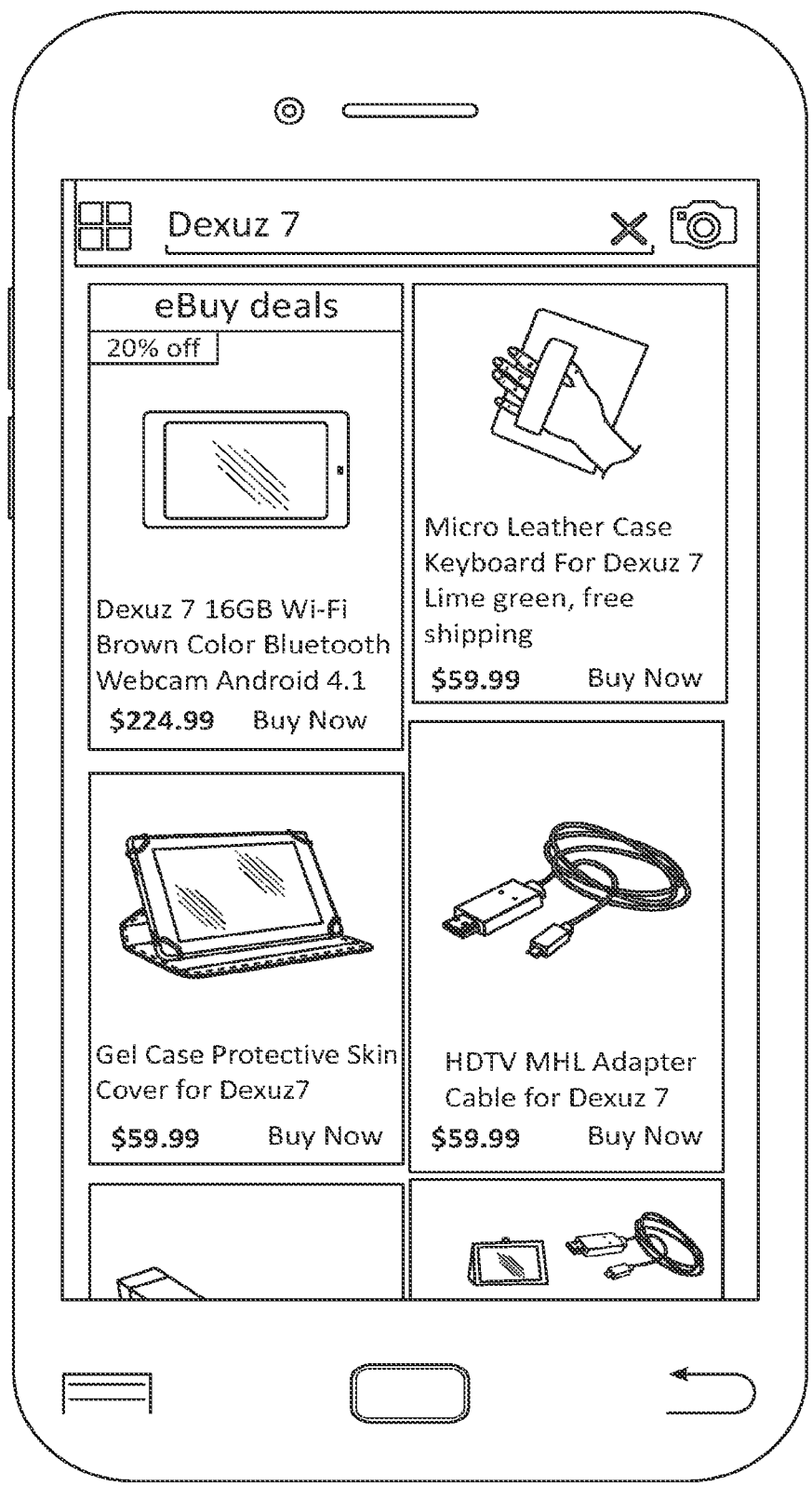
Figure 6K:
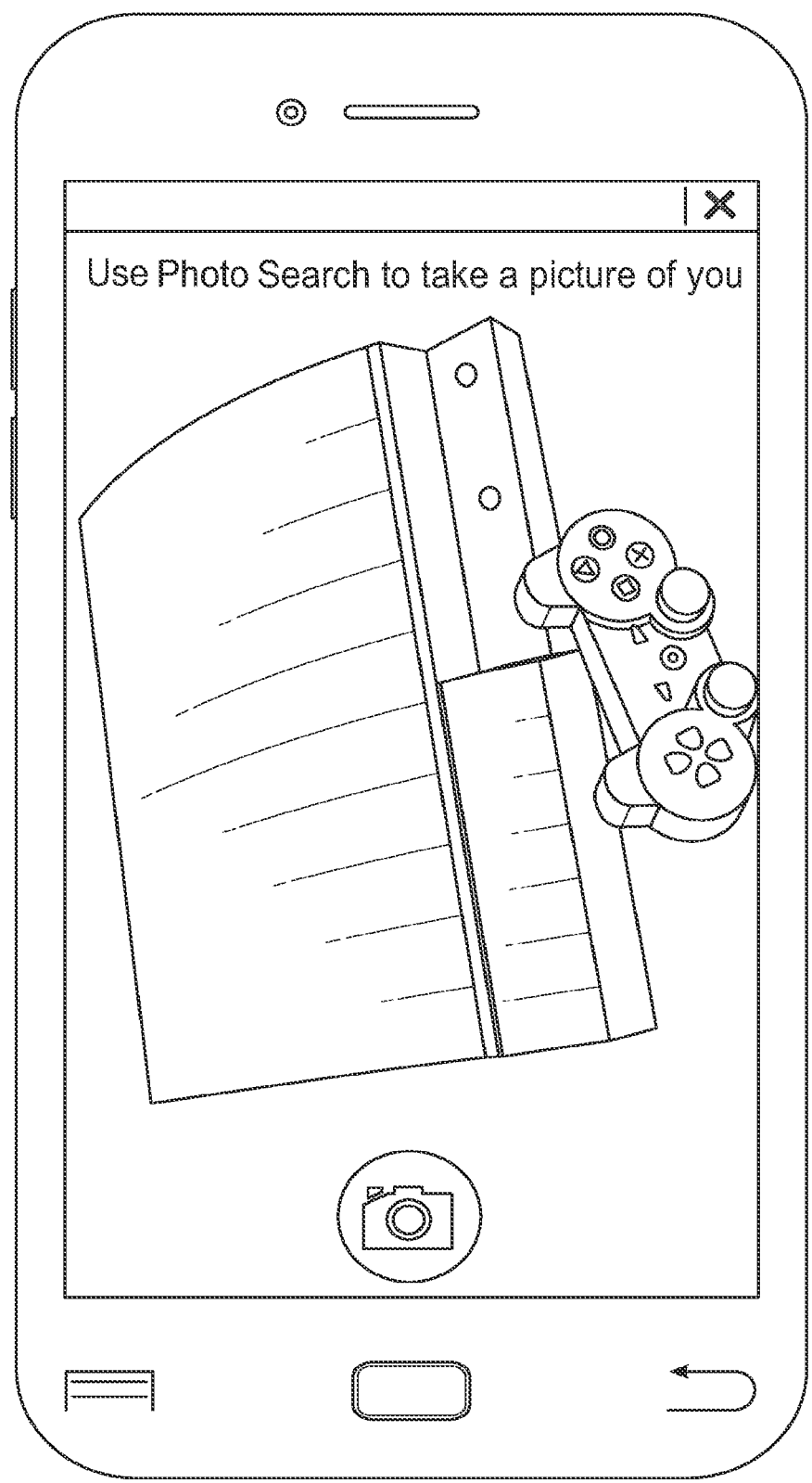
Figure 6L:
Figure 6M:
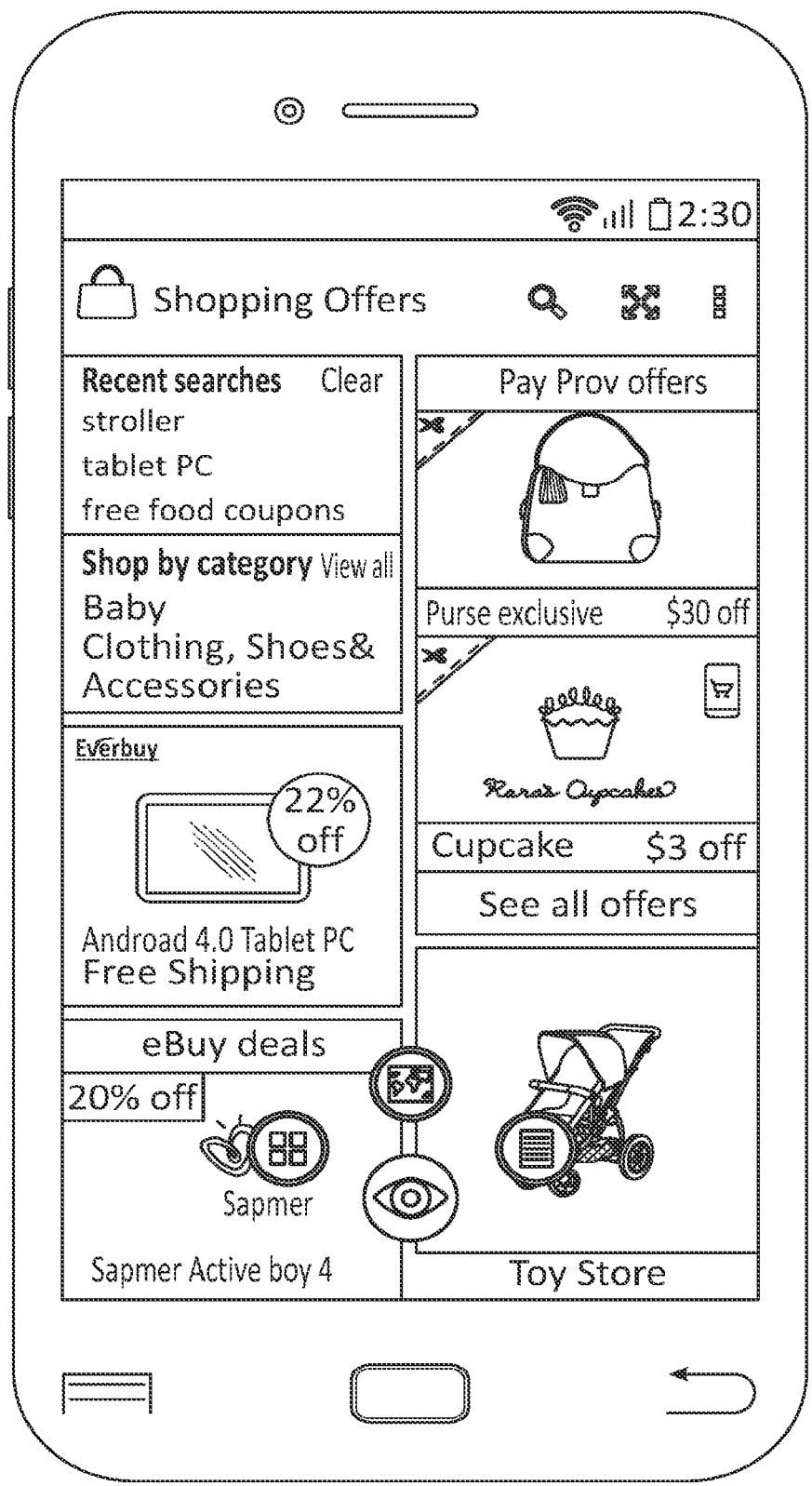
Figure 6N:
Figure 6O:
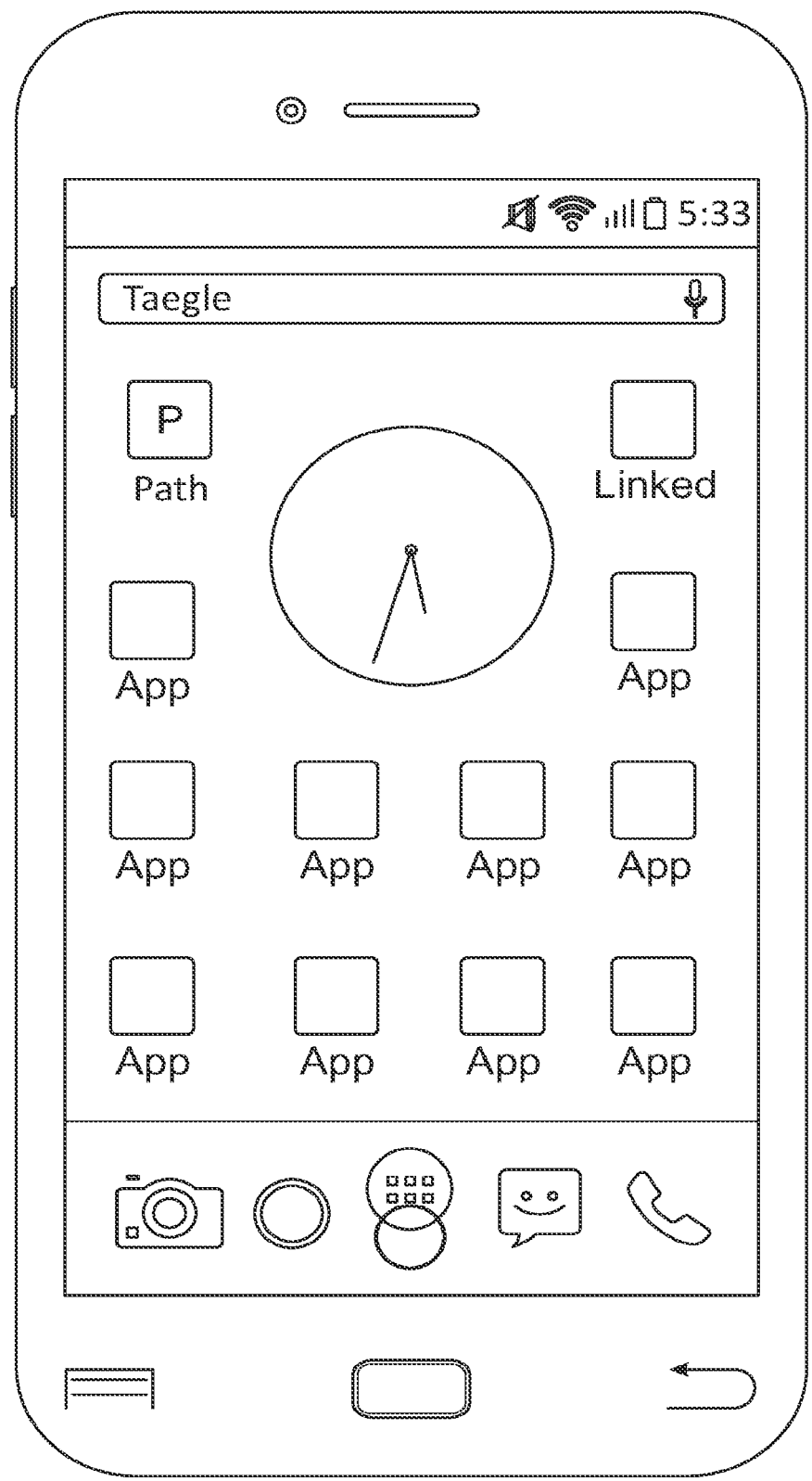
Figure 6P:
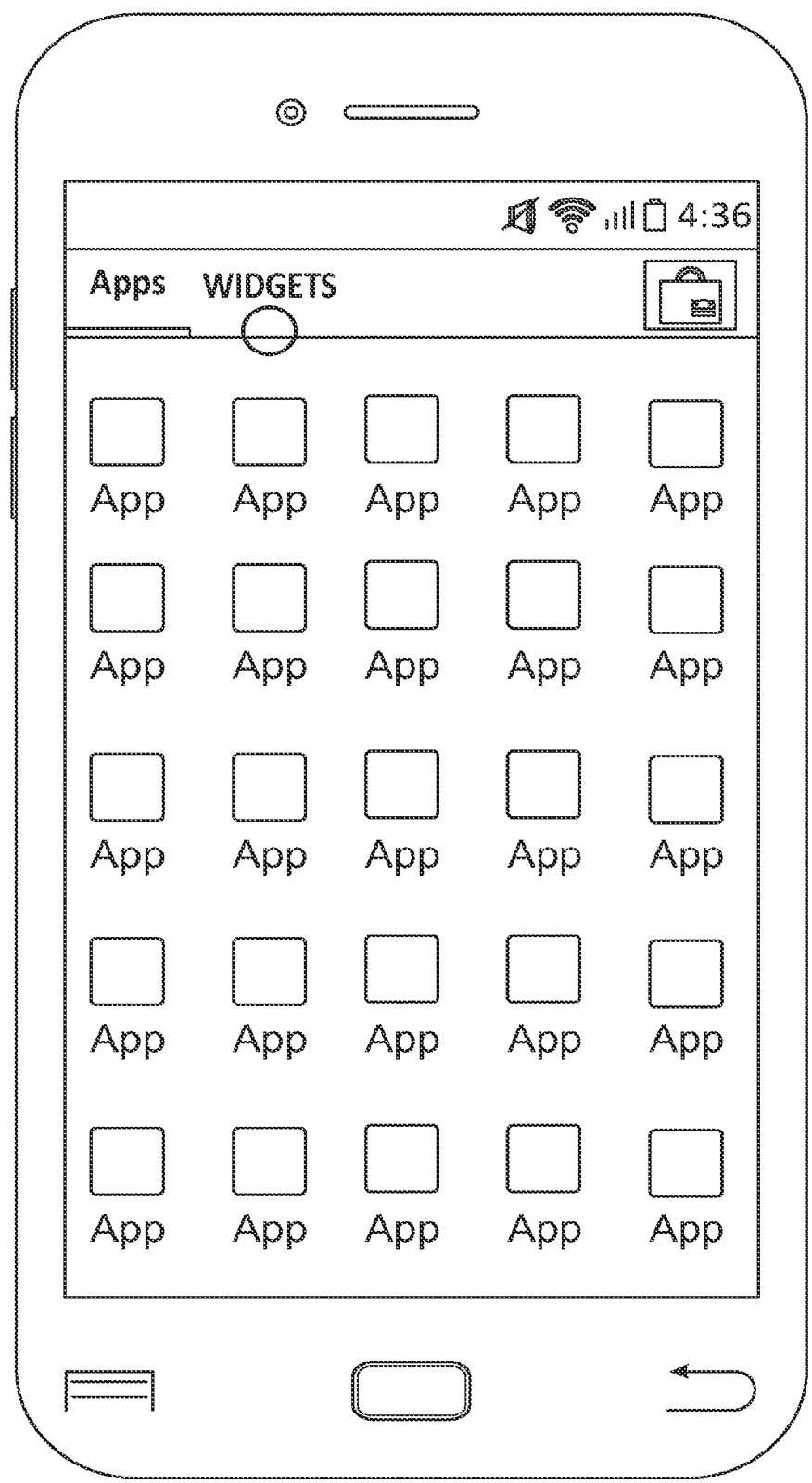
Figure 6Q:
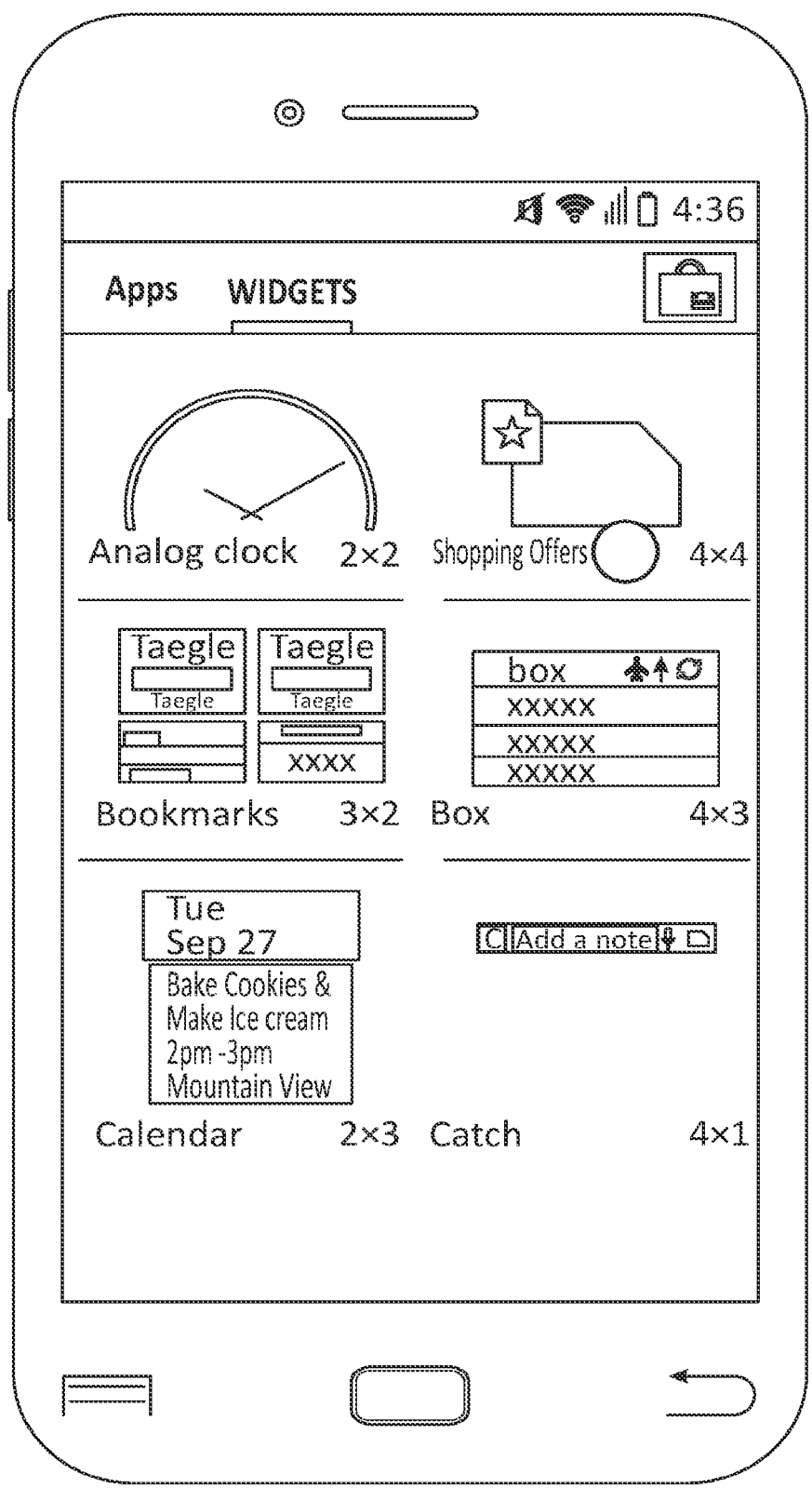
Figure 6R:
Figure 6S:
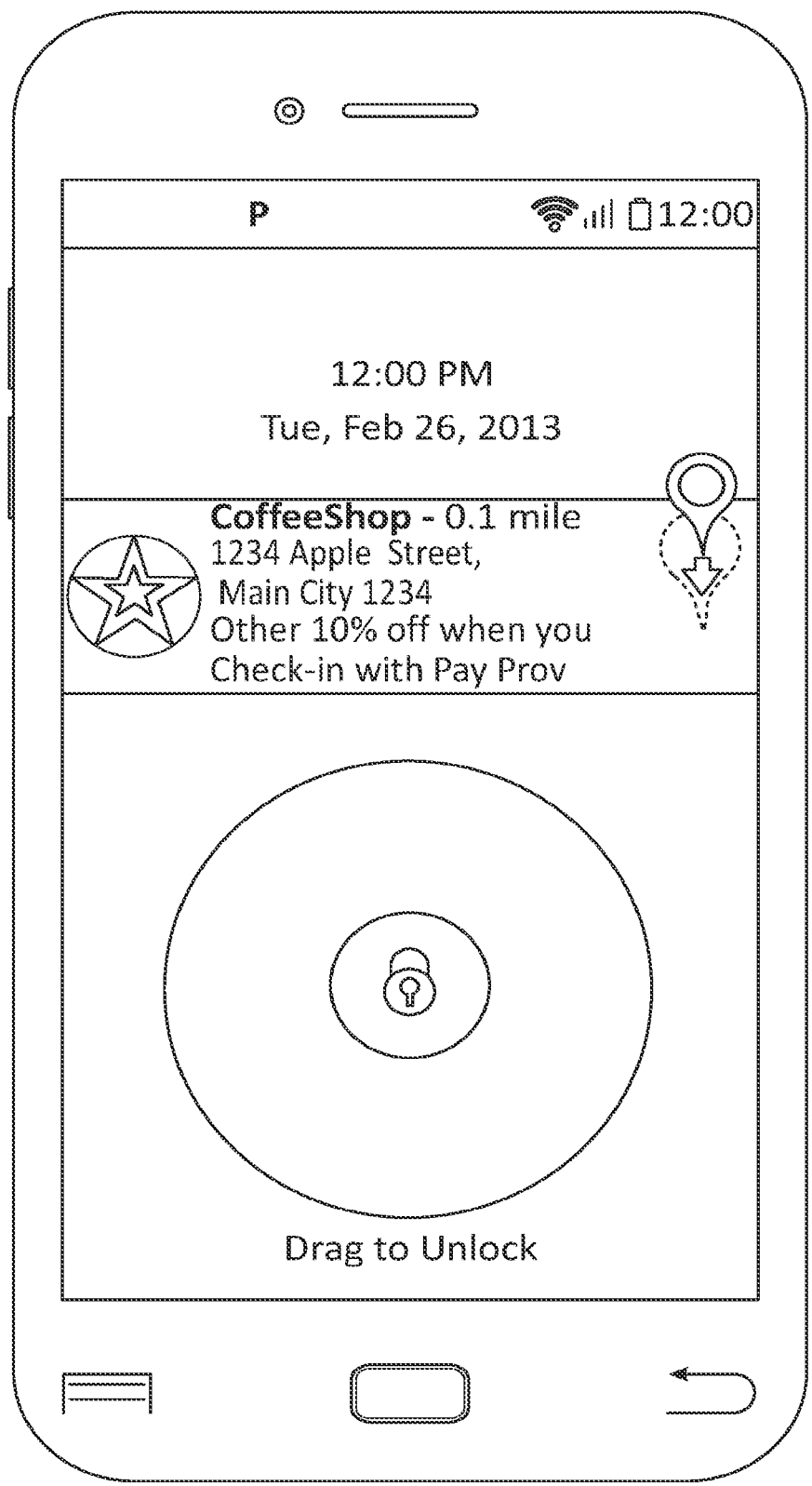
Figure 6T:
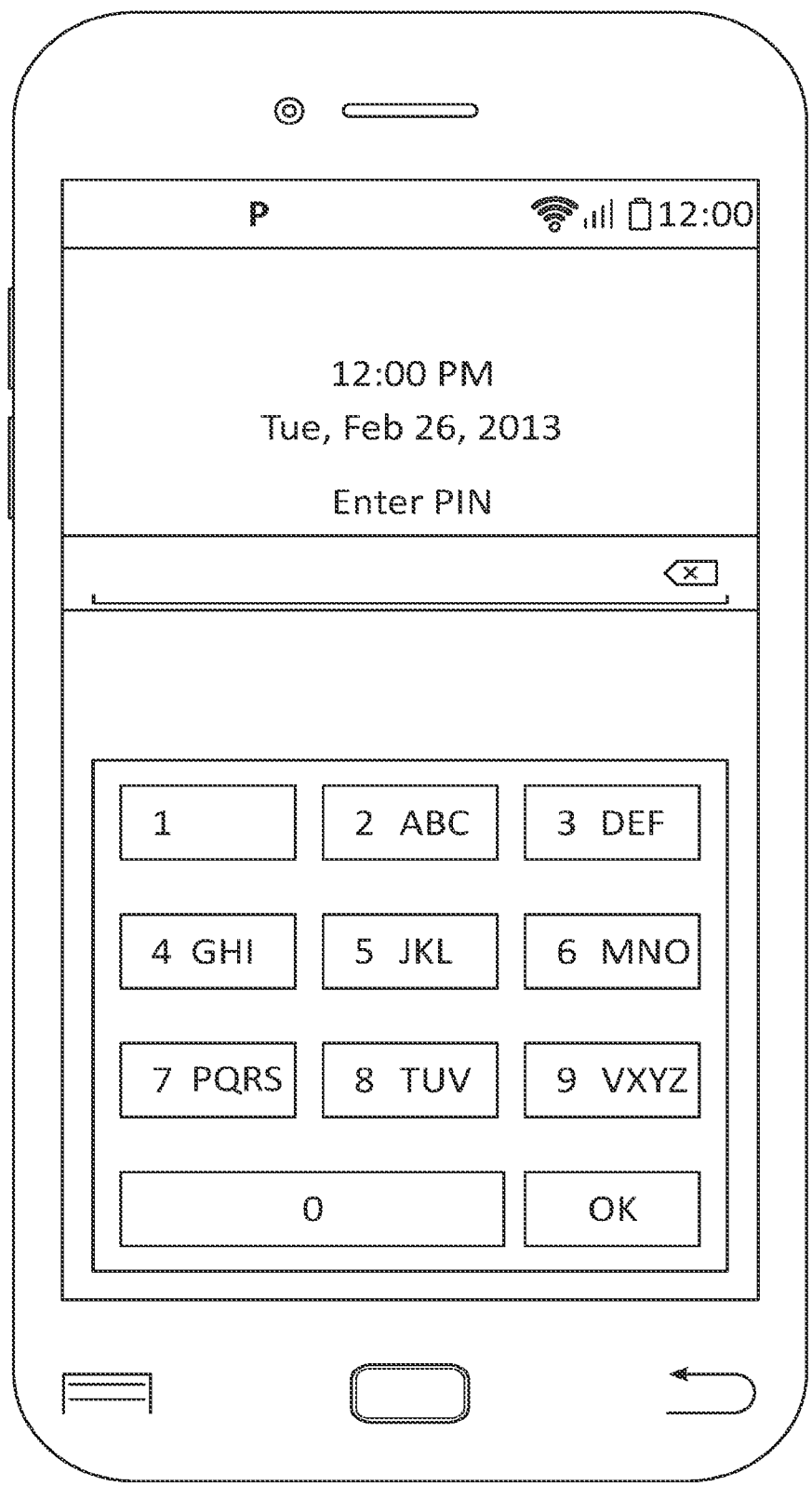
Figure 6U:
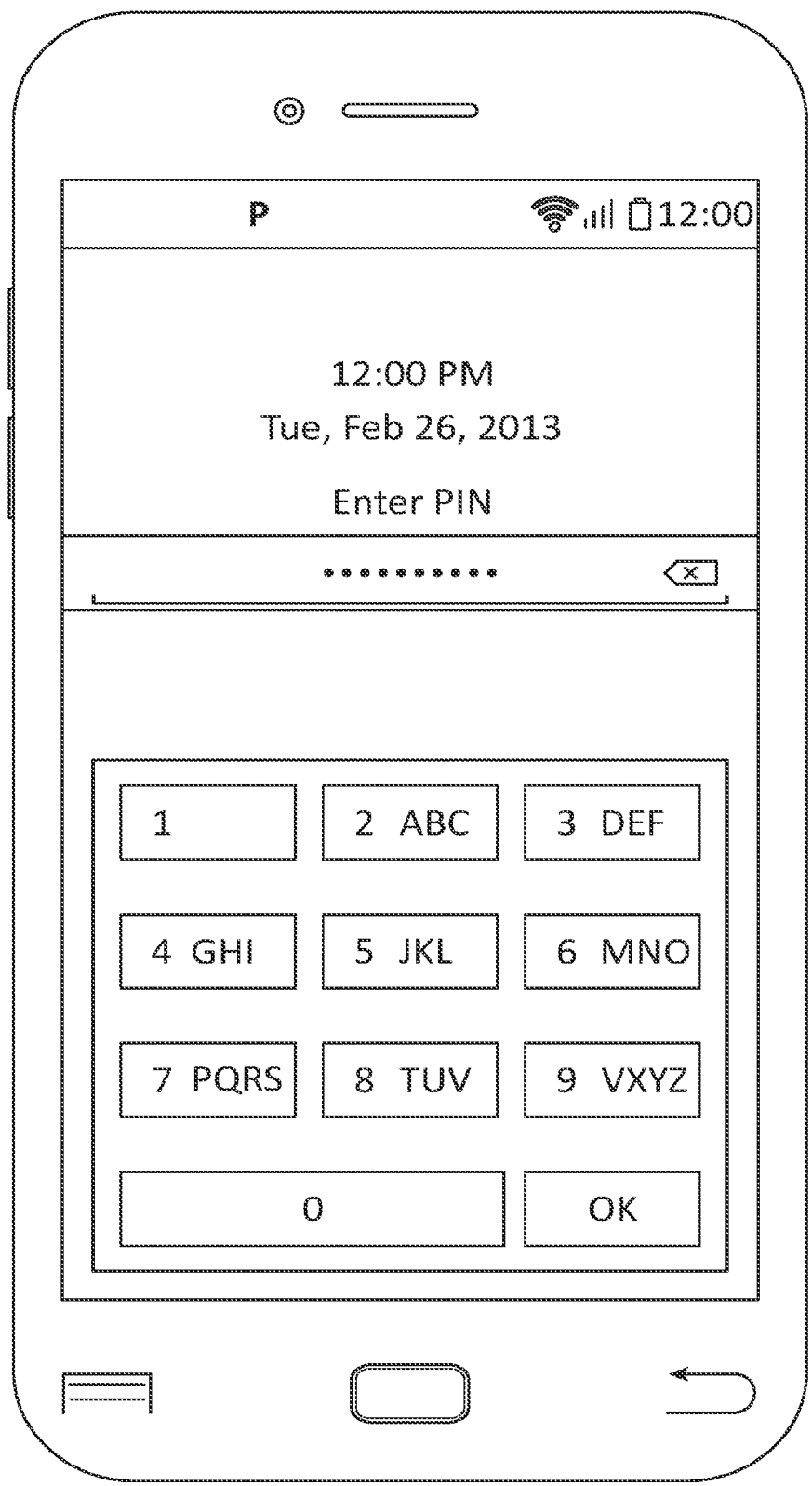
Figure 6V:
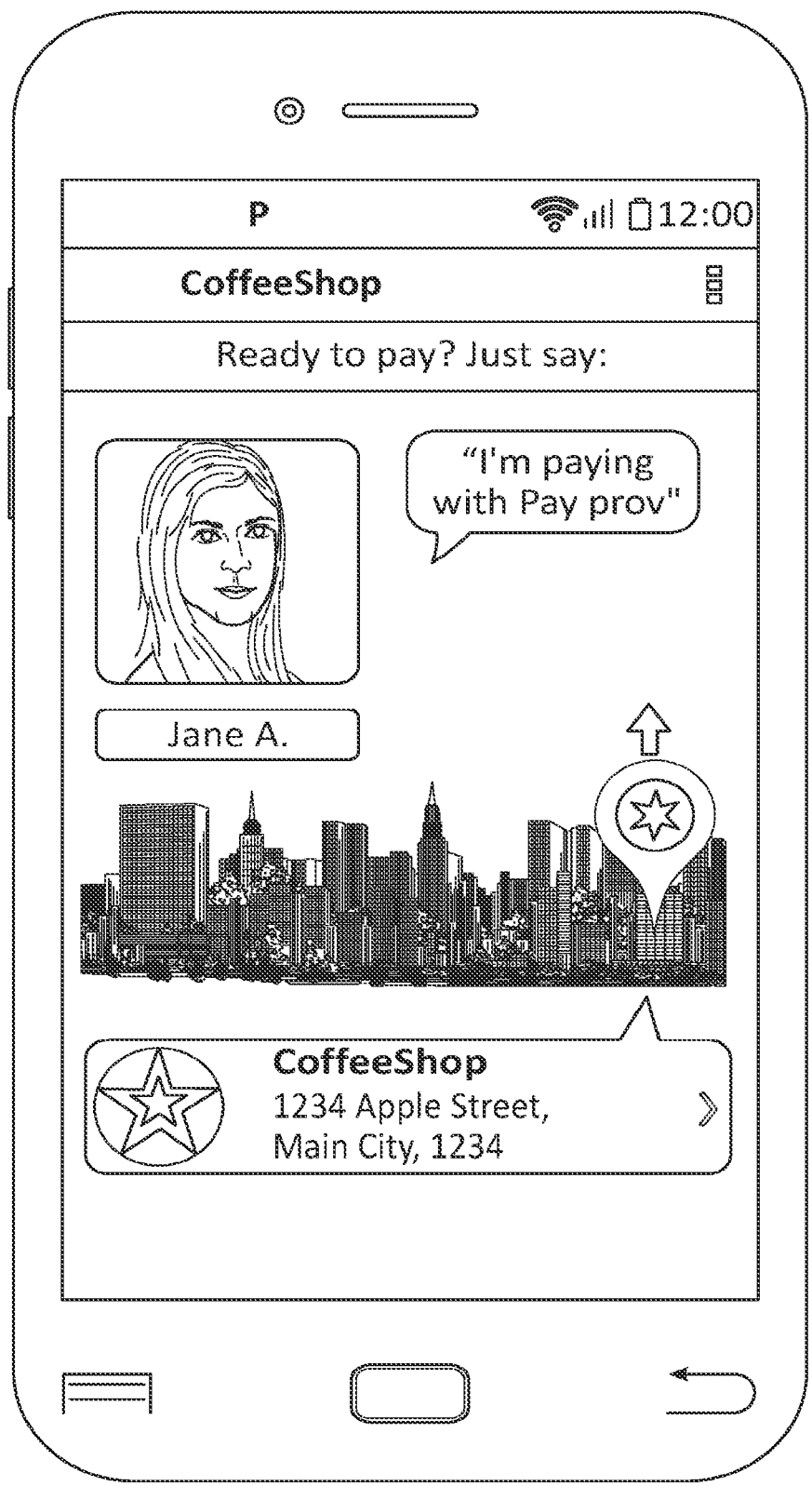
Figure 6W:
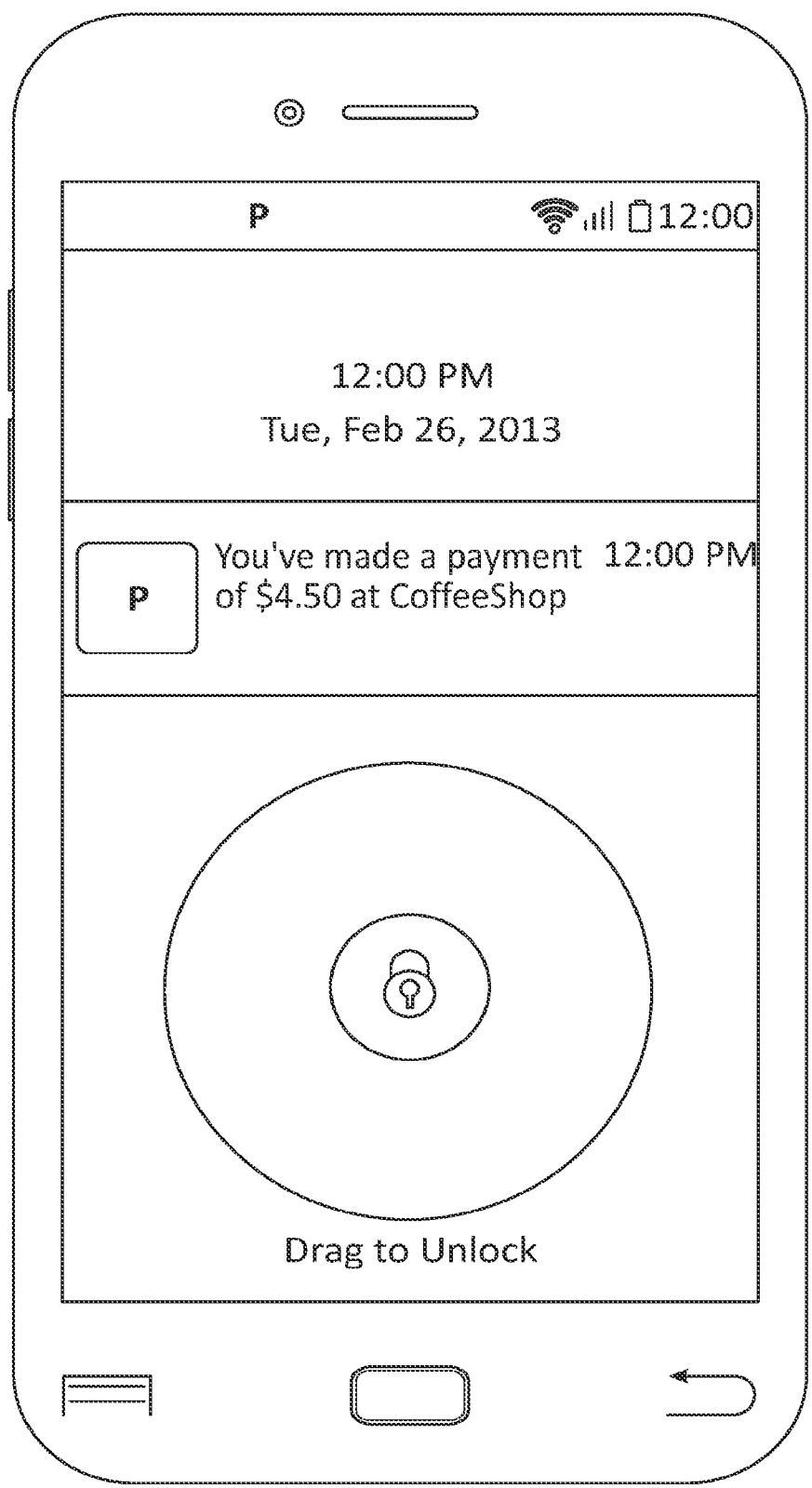
Figure 6X:
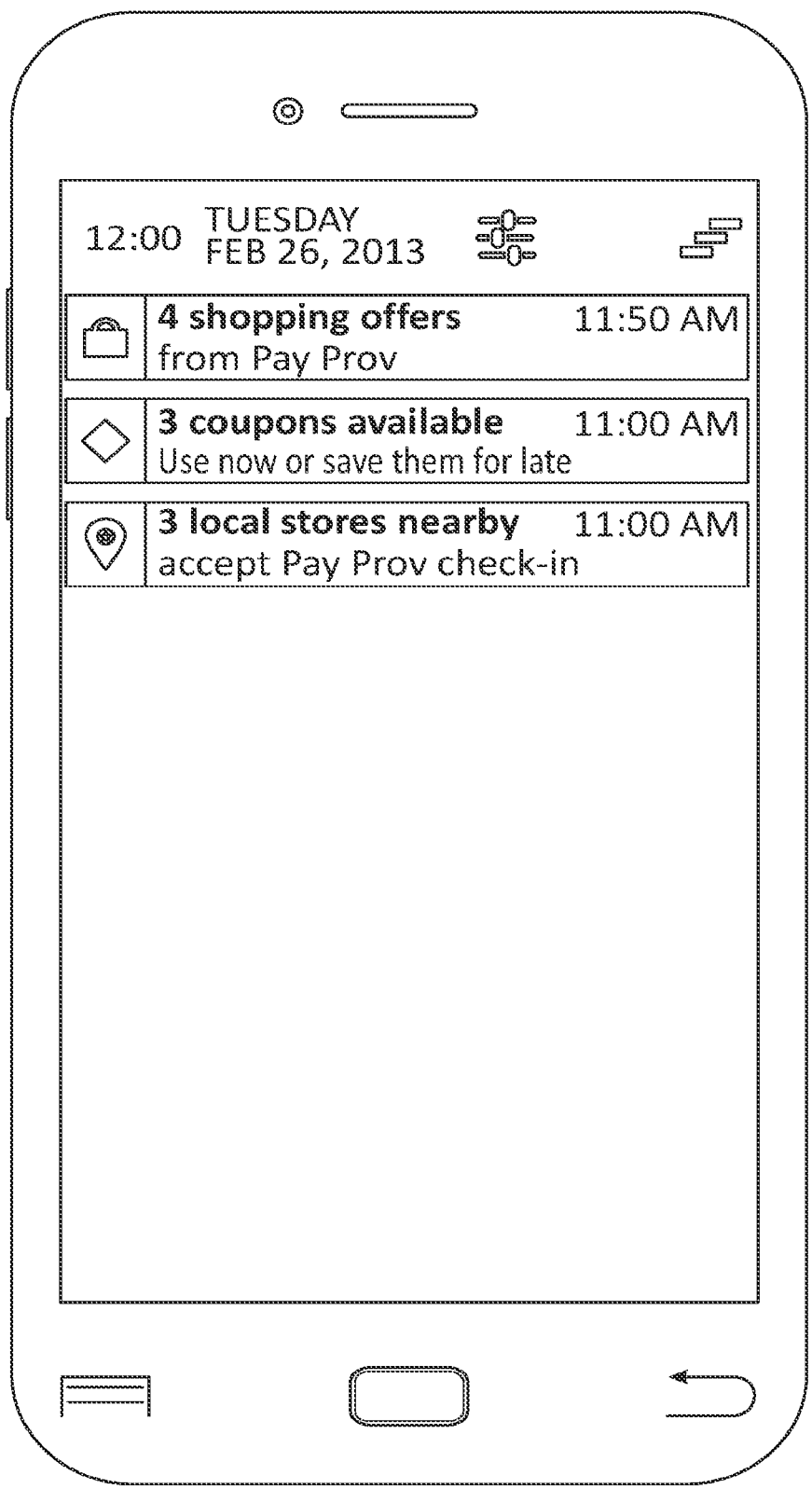
Figure 6Y:
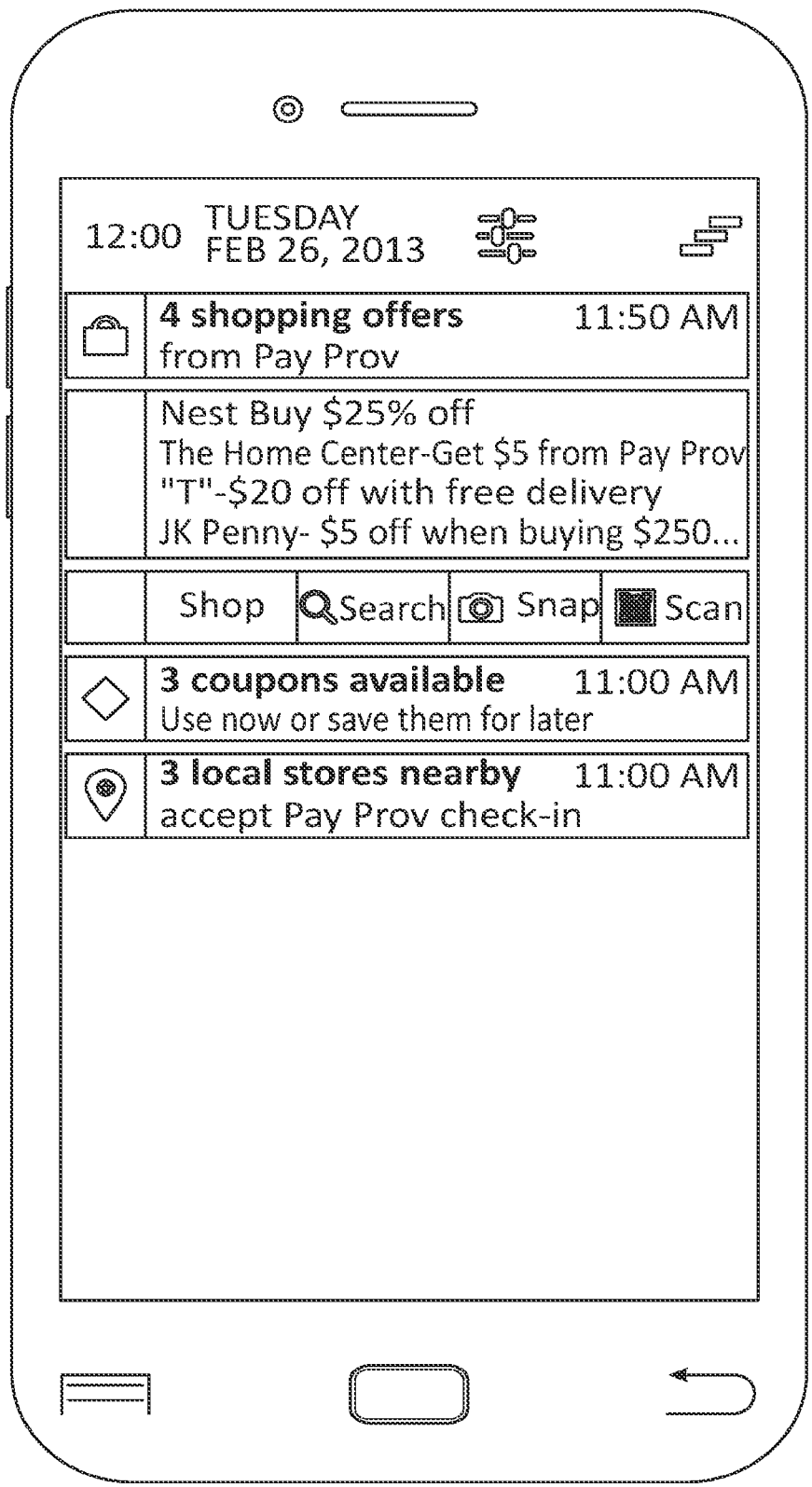
Figure 6Z:
Figure 6A:
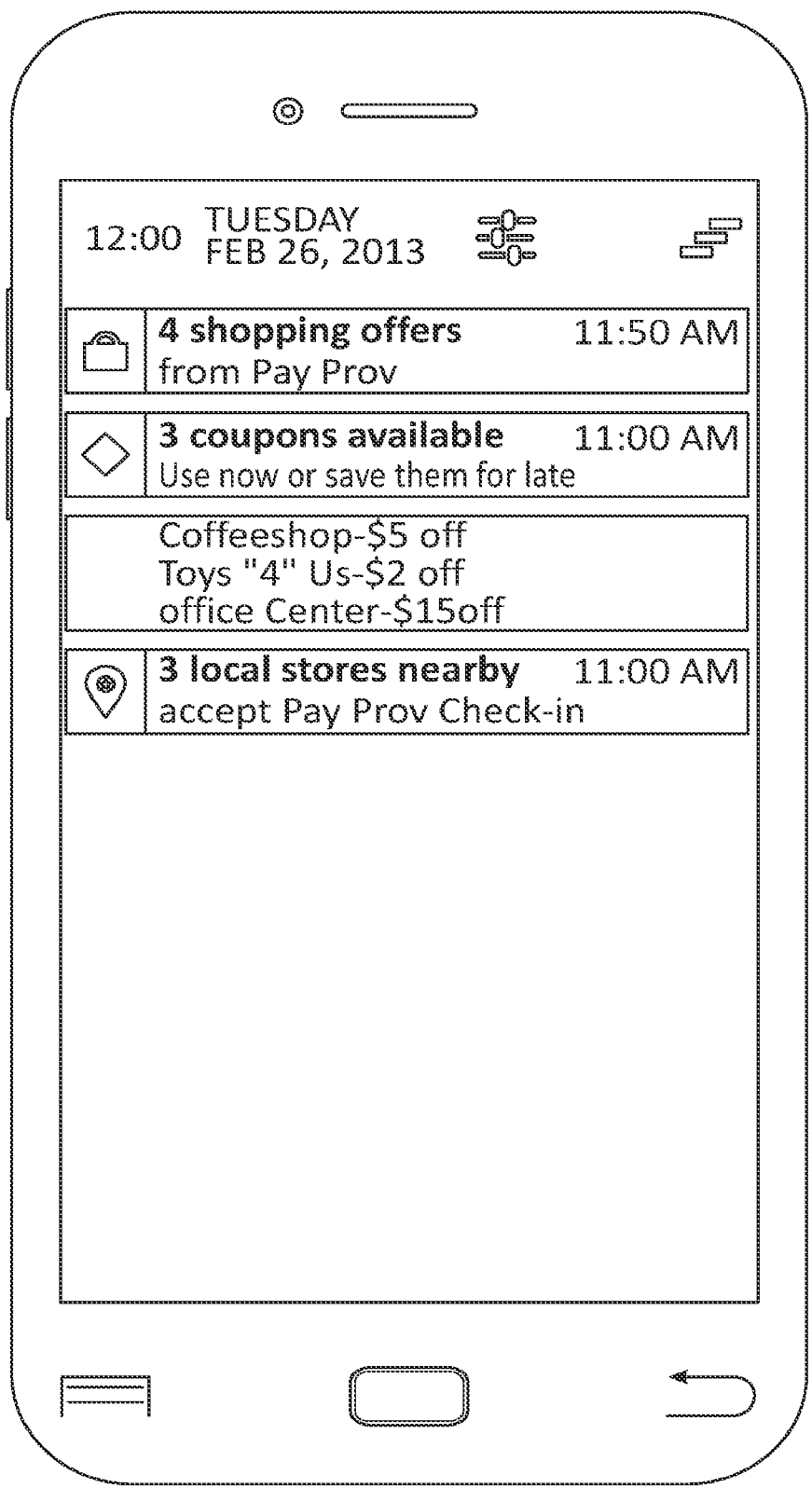
Figure 6A:
Figure 6A:
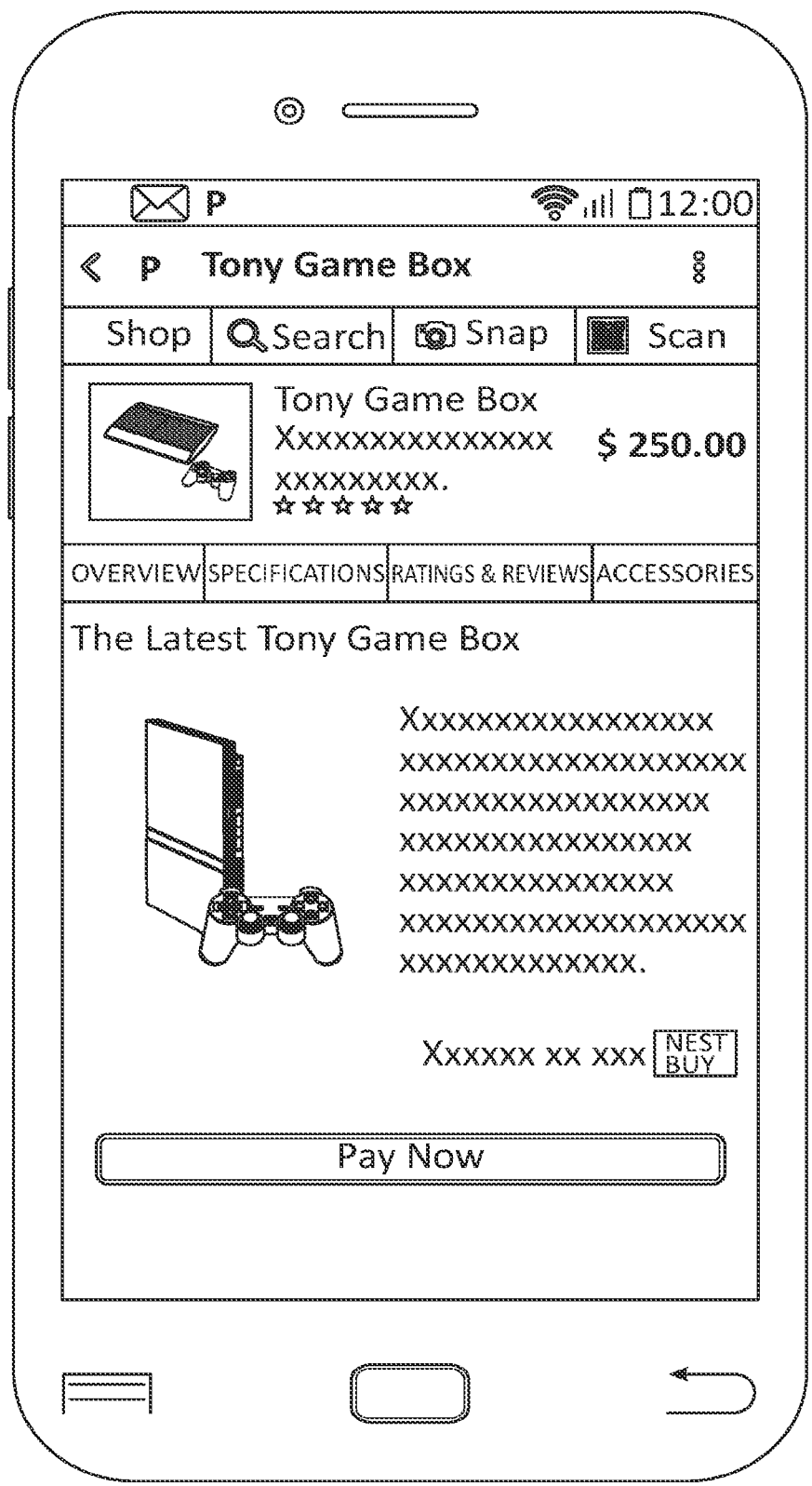
Figure 6A:
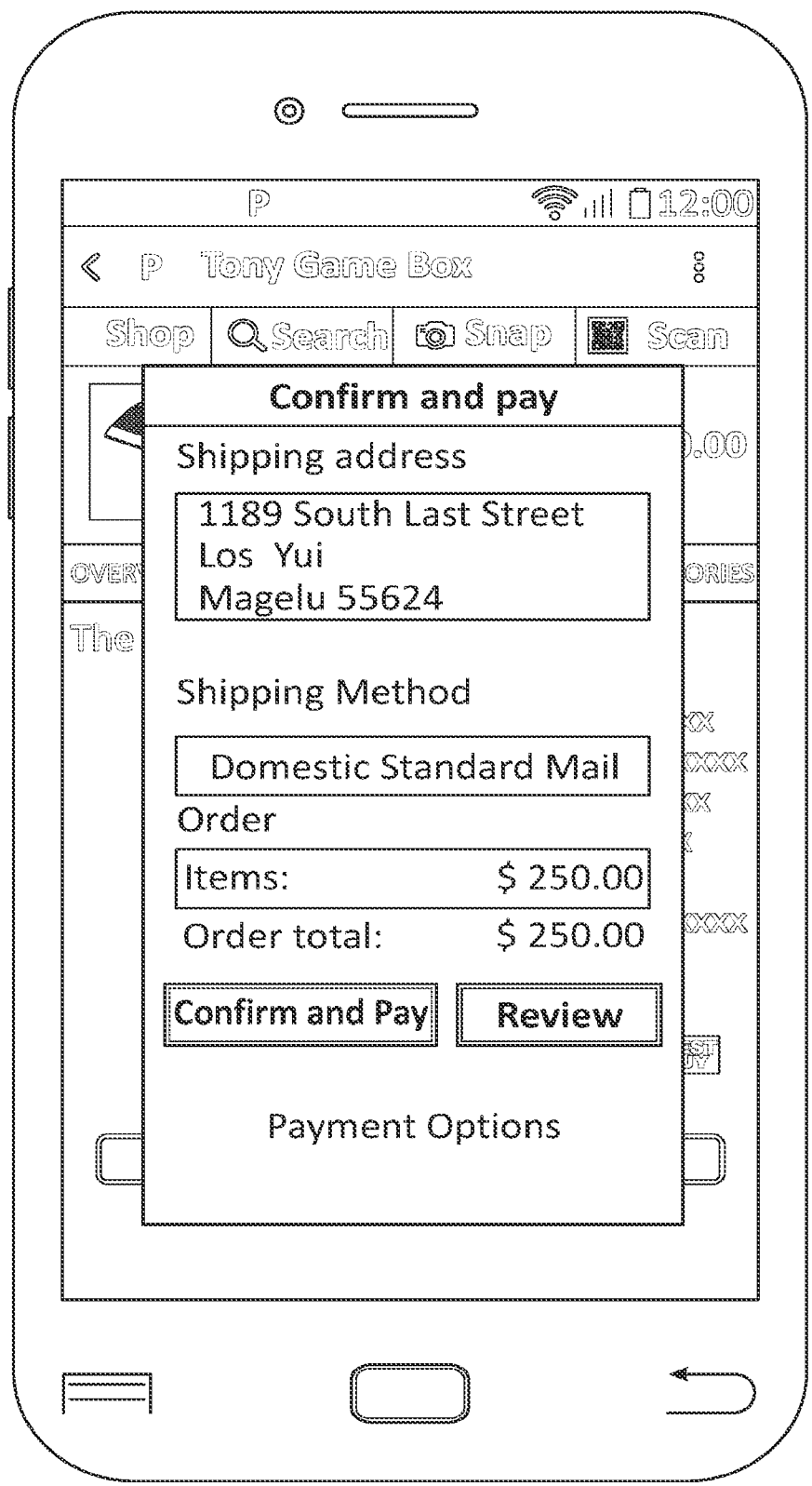
Figure 6A:
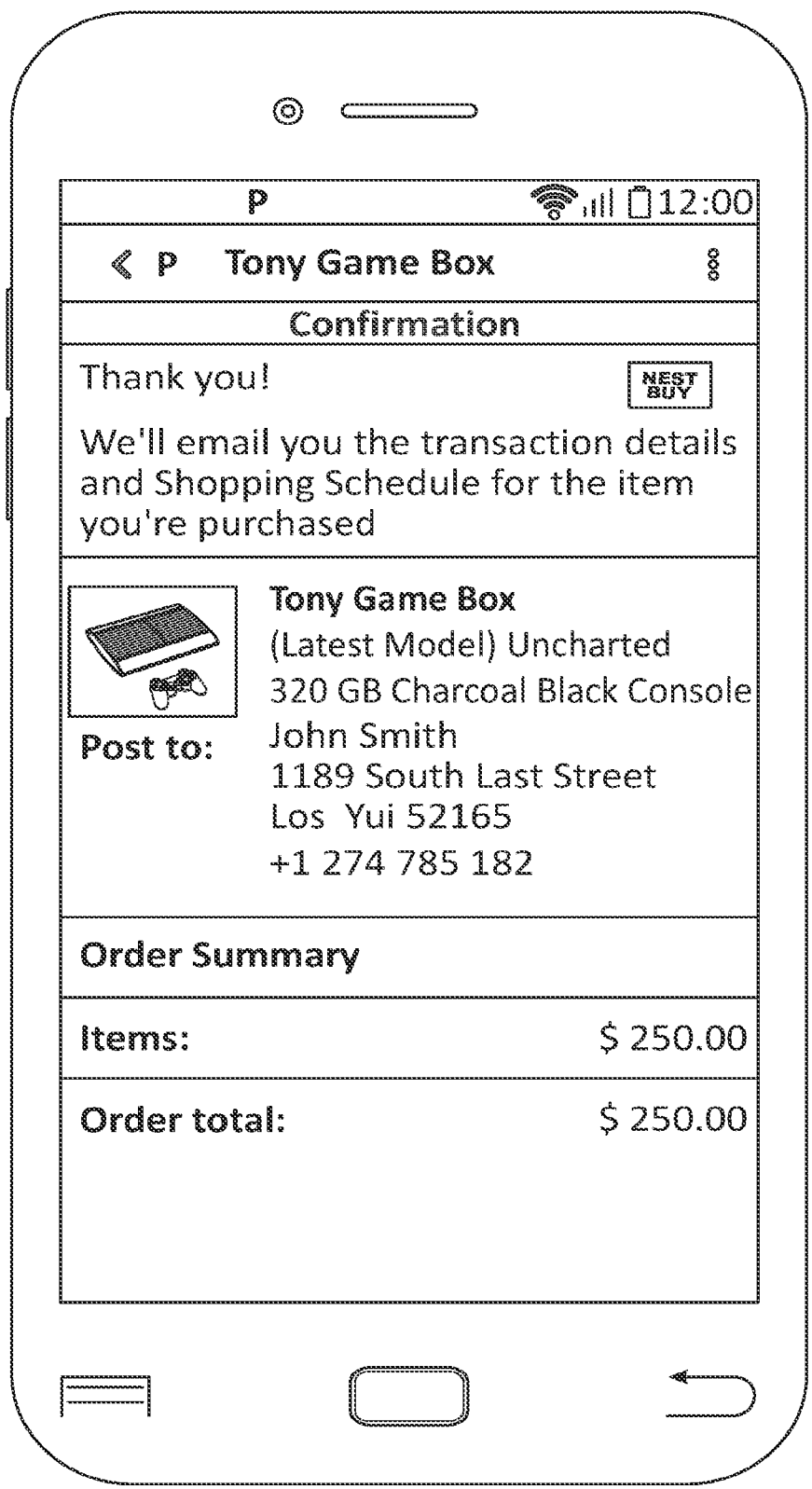
Figure 6A:
Figure 6A:
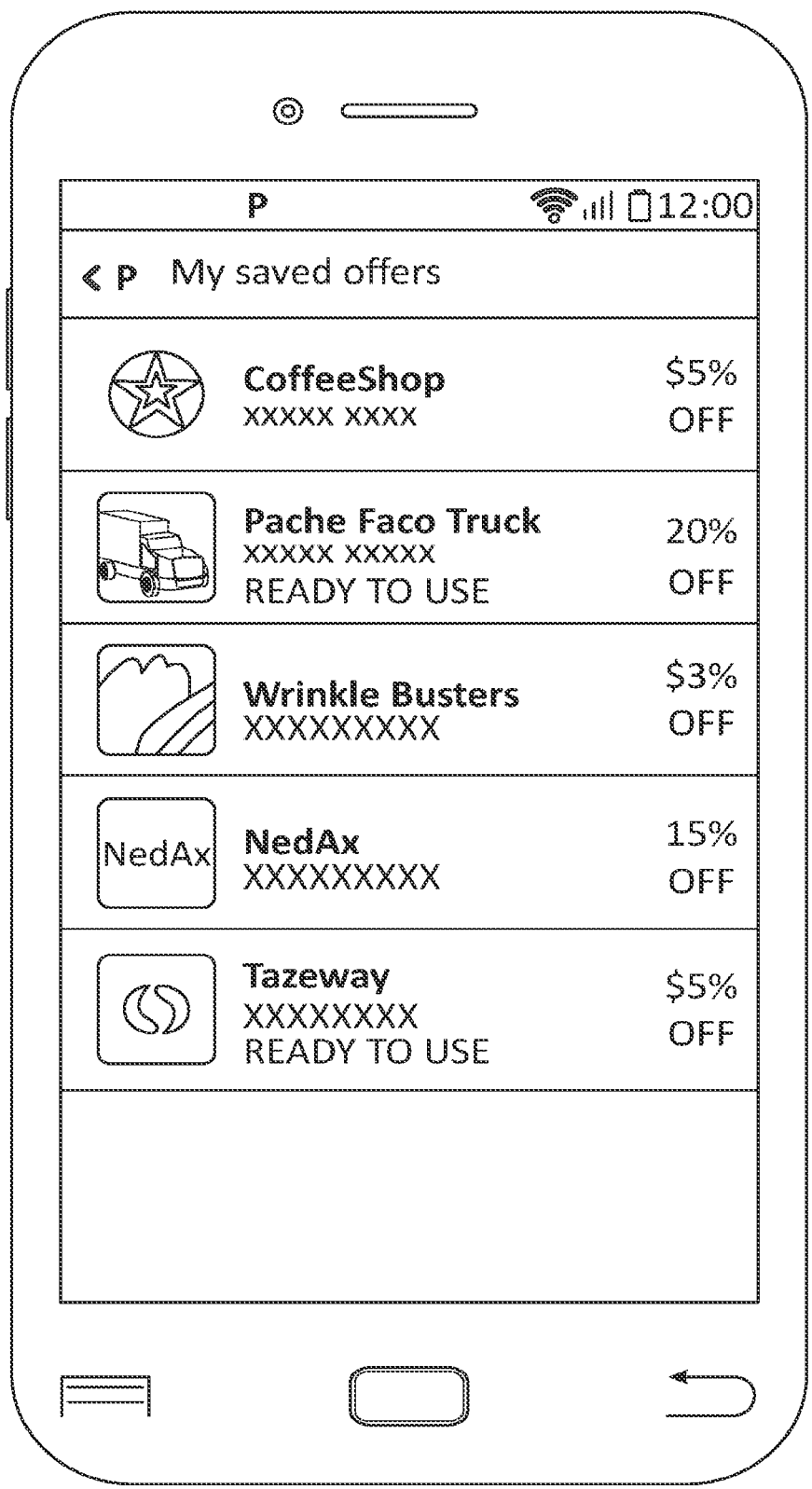
Figure 6A:

FIGS. 6A-6AH are exemplary screenshots of a communication device interface for presenting shopping notification to a user based on shopping preferences and user attributes, according to various embodiments. FIGS. 6A-6AH display shopping notifications as viewed by a user on a user interface of a communication device.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled with the non-transitory memory and configured to read instructions from the non-transitory memory to cause the system to perform operations comprising:
      determining a location of a user device of a user;
      identifying a user profile associated with the user, wherein the user profile includes information corresponding to one or more user attributes or one or more shopping preferences, wherein at least a portion of the one or more shopping preferences are associated with an account of the user;
      determining a plurality of data corresponding to one or more items based on the user profile associated with the user;
      generating a plurality of cells each in individual sections of a user interface of an application on the user device;
      associating each of the individual sections with an individual item from the one or more shopping preferences based on the location of the user device;
      determining a first portion of data of the plurality of data to provide for display in one of the plurality of cells in the user interface, wherein the determining the first portion of data is based on identifying one or more interface display preferences associated with the user;
      generating user interface data for the first portion of data based on the one or more interface display preferences and a layout of the user interface in the application; and
      updating, in the user interface of the application while the user is at the location, the one of the plurality of cells of the user interface with the first portion of data based on the user interface data independent of updating other ones of the plurality of cells while the user is at the location.

2. The system of claim 1, wherein the first portion of data includes one or more offers for the one or more items, and wherein the one or more offers corresponds to one or more merchants.

3. The system of claim 2, wherein the one or more merchants correspond to the location of the user device.

4. The system of claim 1, wherein the plurality of data corresponds to a plurality of merchants.

5. The system of claim 1, wherein a second portion of data of the plurality of data does not correspond to the one or more interface display preferences associated with the user, and wherein the operations further comprise:
   providing the second portion of data to the user device, wherein the providing the second portion of data to the user device causes the user device to not display the second portion of data based on the second portion of data not corresponding to the one or more interface display preferences associated with the user.

6. The system of claim 1, wherein the determining the location of the user device is based on detecting a check-in of the user device at the location via a social networking application that utilizes the social networking account.

7. The system of claim 1, the operations further comprising:
   receiving, via the user interface of the user device, a selection of a user interface element corresponding to the first portion of data; and
   in response to receiving the selection of the user interface element, processing a payment for a first item of the one or more items that corresponds to the first portion of data.

8. A method, comprising:
   determining a location of a user device of a user;
   identifying a user profile associated with the user, wherein the user profile includes information corresponding to one or more user attributes or one or more shopping preferences, wherein at least a portion of the one or more shopping preferences are associated with the user;
   determining a plurality of data corresponding to one or more items based on the user profile associated with the user;
   generating a plurality of cells each in individual sections of a user interface of an application on the user device;
   associating each of the individual sections with an individual item from the one or more shopping preferences based on the location of the user device;
   determining a first portion of data of the plurality of data to provide for display in one of the plurality of cells in the user interface, wherein the determining the first portion of data is based on identifying one or more interface display preferences associated with the user;
   generating user interface data for the first portion of data based on the one or more interface display preferences and a layout of the user interface in the application; and
   updating, in the user interface of the application while the user is at the location, the one of the plurality of cells of the user interface with the first portion of data based on the user interface data independent of updating other ones of the plurality of cells while the user is at the location.

9. The method of claim 8, wherein the first portion of data includes one or more offers for the one or more items, and wherein the one or more offers corresponds to one or more merchants.

10. The method of claim 9, wherein the one or more merchants correspond to the location of the user device.

11. The method of claim 8, wherein the plurality of data corresponds to a plurality of merchants.

12. The method of claim 8, wherein a second portion of data of the plurality of data does not correspond to the one or more interface display preferences associated with the user, and wherein the method further comprises:

providing the second portion of data to the user device, wherein the providing the second portion to the user device causes the user device to not display the second portion of data based on the second portion of data not corresponding to the one or more interface display preferences associated with the user.

13. The method of claim 8, wherein the determining the location of the user device is based on detecting a check-in of the user device at the location via a social networking application that utilizes the social networking account.

14. The method of claim 8, further comprising:

receiving, via the user interface of the user device, a selection of a user interface element corresponding to the first portion of data; and in response to receiving the selection of the user interface element, processing a payment for a first item of the one or more items that corresponds to the first portion of data.

15. A non-transitory machine-readable medium stored thereon machine-readable instructions executable to cause a machine to perform operations comprising:

determining a location of a user device of a user;

identifying a user profile associated with the user, wherein the user profile includes information corresponding to one or more user attributes or one or more shopping preferences, wherein at least a portion of the one or more shopping preferences are determined from an account of the user;

determining a plurality of data corresponding to one or more items based on the user profile associated with the user;

generating a plurality of cells each in individual sections of a user interface of an application on the user device;

associating each of the individual sections with an individual item from the one or more shopping preferences based on the location of the user device;

determining a first portion of data of the plurality of data to provide for display in one of the plurality of cells in the user interface, wherein the determining the first portion of data is based on identifying one or more interface display preferences associated with the user;

generating user interface data for the first portion of data based on the one or more interface display preferences and a layout of the user interface in the application; and updating, in the user interface of the application while the user is at the location, the one of the plurality of cells of the user interface with the first portion of data based on the user interface data independent of updating other ones of the plurality of cells while the user is at the location.

16. The non-transitory machine-readable medium of claim 15, wherein the first portion of data includes one or more offers for the one or more items, and wherein the one or more offers corresponds to one or more merchants.

17. The non-transitory machine-readable medium of claim 16, wherein the one or more merchants correspond to the location of the user device.

18. The non-transitory machine-readable medium of claim 15, wherein the plurality of data corresponds to a plurality of merchants.

19. The non-transitory machine-readable medium of claim 15, wherein a second portion of data of the plurality of data does not correspond to the one or more interface display preferences associated with the user, and wherein the operations further comprise:

providing the second portion of data to the user device, wherein the providing the second portion of data to the user device causes the user device to not display the second portion of data based on the second portion of data not corresponding to the one or more interface display preferences associated with the user.

20. The non-transitory machine-readable medium of claim 15, the operations further comprising:

receiving, via the user interface of the user device, a selection of a user interface element corresponding to the first portion of data; and in response to receiving the selection of the user interface element, processing a payment for a first item of the one or more items that corresponds to the first portion of data.

* * * * *